US012737398B2

(12) United States Patent
Kim et al.

(10) Patent No.: US 12,737,398 B2
(45) Date of Patent: Sep. 15, 2026

(54) METHOD OF GENERATING KEYWORD INFORMATION AND AN ELECTRONIC DEVICE PERFORMING THEREOF

(71) Applicant: Dunamu Inc., Seoul (KR)

(72) Inventors: Jaehyuk Kim, Seoul (KR); Dongjun Lee, Seoul (KR); Seokhyun Hwang, Gwangju-si (KR)

(73) Assignee: Dunamu Inc., Seoul (KR)

( * ) Notice: Subject to any disclaimer, the term of this patent is extended or adjusted under 35 U.S.C. 154(b) by 143 days.

(21) Appl. No.: 18/741,439

(22) Filed: Jun. 12, 2024

(65) Prior Publication Data

US 2024/0419703 A1 Dec. 19, 2024

(30) Foreign Application Priority Data

Jun. 16, 2023 (KR) ........................ 10-2023-0077480

(51) Int. Cl.
*G06F 16/3332* (2025.01)
*G06F 16/338* (2019.01)
*G06F 40/295* (2020.01)

(52) U.S. Cl.
CPC ........ *G06F 16/3334* (2019.01); *G06F 16/338* (2019.01); *G06F 40/295* (2020.01)

(58) Field of Classification Search
CPC .. G06F 16/3334; G06F 16/338; G06F 40/295; G06F 16/313; G06F 16/36; G06F 16/9024; G06F 40/268; G06N 3/08; G06Q 40/06
See application file for complete search history.

(56) References Cited

U.S. PATENT DOCUMENTS 5,675,819 A 10/1997 Schuetze
6,473,751 B1 * 10/2002 Nikolovska ........... G06F 16/735 707/E17.138
10,049,148 B1 8/2018 Fang et al.
11,392,651 B1 * 7/2022 McClusky ............ G06F 16/338
(Continued)

FOREIGN PATENT DOCUMENTS

KR 10-2010-0033585 A 3/2010
KR 10-2020-0056627 A 5/2020
(Continued)

OTHER PUBLICATIONS

Kim et al., "Investment Universe Construction Based on the Theme Keyword Search," IEEE Access 7, 2019. (9 pages).

*Primary Examiner* — Michael Colucci
(74) *Attorney, Agent, or Firm* — Seed Intellectual Property Law Group LLP

(57) ABSTRACT

Provided is a method of generating keyword information by an electronic device. The method includes identifying a text set including at least one text element. The method includes using a named entity recognition (NER) model based on deep learning, identifying keywords in the at least one text element. The method includes based on the text set, determining degrees of association of keyword pairs included in a keyword set including the keywords. The method includes obtaining information on a query word that is input by a user. The method includes based on at least one among the degrees of association, generating information on response words corresponding to the query word.

17 Claims, 19 Drawing Sheets

1410

| Query word \ Response word | First response word | Second response word |
|---|---|---|
| First word | Company A, Company B, Company C, Company D, Company E, Company F, Company G, Company H and Company I | Keyword A, Keyword B, Keyword C, Keyword E, Keyword F, Keyword G, Keyword H and Keyword I |
| Second word | Company A, Company G, Company I, Company B, Company J, Company K, Company L and Company M | Keyword A, Keyword C, Keyword F, Keyword I, Keyword J, Keyword K, Keyword L and Keyword M |
| [First word, Second word] | Company A, Company B, Company G and Company I | Keyword A, Keyword C, Keyword F and Keyword I |

1420

| Query word \ Response word | First response word | Second response word |
|---|---|---|
| First company | Company A, Company B, Company C, Company D, Company E, Company F, Company G, Company H and Company I | Keyword A, Keyword B, Keyword C, Keyword E, Keyword F, Keyword G, Keyword H and Keyword I |
| Second company | Company A, Company G, Company I, Company B, Company J, Company K, Company L and Company M | Keyword A, Keyword C, Keyword F, Keyword I, Keyword J, Keyword K, Keyword L and Keyword M |
| [First company, Second company] | Company A, Company B, Company G and Company I | Keyword A, Keyword C, Keyword F and Keyword I |

(56) References Cited

U.S. PATENT DOCUMENTS

| | | | | |
|---|---|---|---|---|
| 11,675,790 | B1 * | 6/2023 | Jami | G06F 18/217 707/736 |
| 2004/0098381 | A1 | 5/2004 | Parikh et al. | |
| 2011/0047153 | A1 | 2/2011 | Betz | |
| 2011/0119052 | A1 * | 5/2011 | Onodera | G10L 15/187 704/E15.001 |
| 2011/0279458 | A1 * | 11/2011 | Gnanasambandam | G06Q 30/0251 358/1.15 |
| 2018/0336278 | A1 | 11/2018 | Agarwal et al. | |
| 2019/0155944 | A1 * | 5/2019 | Mahata | G06F 16/9024 |
| 2020/0313975 | A1 * | 10/2020 | Xia | H04L 41/12 |
| 2021/0019309 | A1 * | 1/2021 | Yadav | G06F 16/2428 |
| 2024/0419703 | A1 * | 12/2024 | Kim | G06F 16/338 |

FOREIGN PATENT DOCUMENTS

| | | | |
|---|---|---|---|
| KR | 2021-0130976 | A | 11/2021 |
| KR | 2021-0138266 | A | 11/2021 |
| KR | 20220061401 | A | 5/2022 |
| KR | 20220109146 | A | 8/2022 |

* cited by examiner

FIG. 4

| | Text element | Sub keyword set | Target keyword |
|---|---|---|---|
| 410 | Company A and Company B, global semiconductor leaders, are speeding up the commercialization of Semiconductor C which is called "the game changer." | Company A, Company B, Semiconductor, Semiconductor C | Company A, Company B |
| 420 | However, Company D which ranks third in the industry has already entered Semiconductor C research since 2019 and has secured two to three times more patents than Company A and Company B. | Company D, Semiconductor C, Company A, Company B | Company A, Company B, Company D |
| 430 | There is concern that if Company A and Company B do not actively prepare for the next-generation market, their current leadership in semiconductor technology could be overturned in an instant. | Company A, Company B, Semiconductor | Company A, Company B |
| 440 | Company B developed the world's first Semiconductor E and supplied it to Company F, and the company B maintains the No. 1 market share in the field of Semiconductor E. | Company B, Semiconductor E, Company F | Company B, Company F |
| 450 | Semiconductor E is evaluated as the optimal product in the AI semiconductor market, which requires processing various data at ultra-high speed. | Semiconductor E, AI Semiconductor | - |
| 460 | In particular, AI technology is expected to lead to increased demand for Semiconductor E, and it is assessed that this could be a positive sign for Company B, which focuses on ultra-high-speed processing semiconductors. | Semiconductor E, AI, Semiconductor, Company B | Company B |

500
501
502
503
Company B
Semiconductor
Semiconductor C
Company A
Company D
510
511
512
513
AI Semiconductor
Semiconductor E
Company F
Company B
Semiconductor
AI

Figure 6:
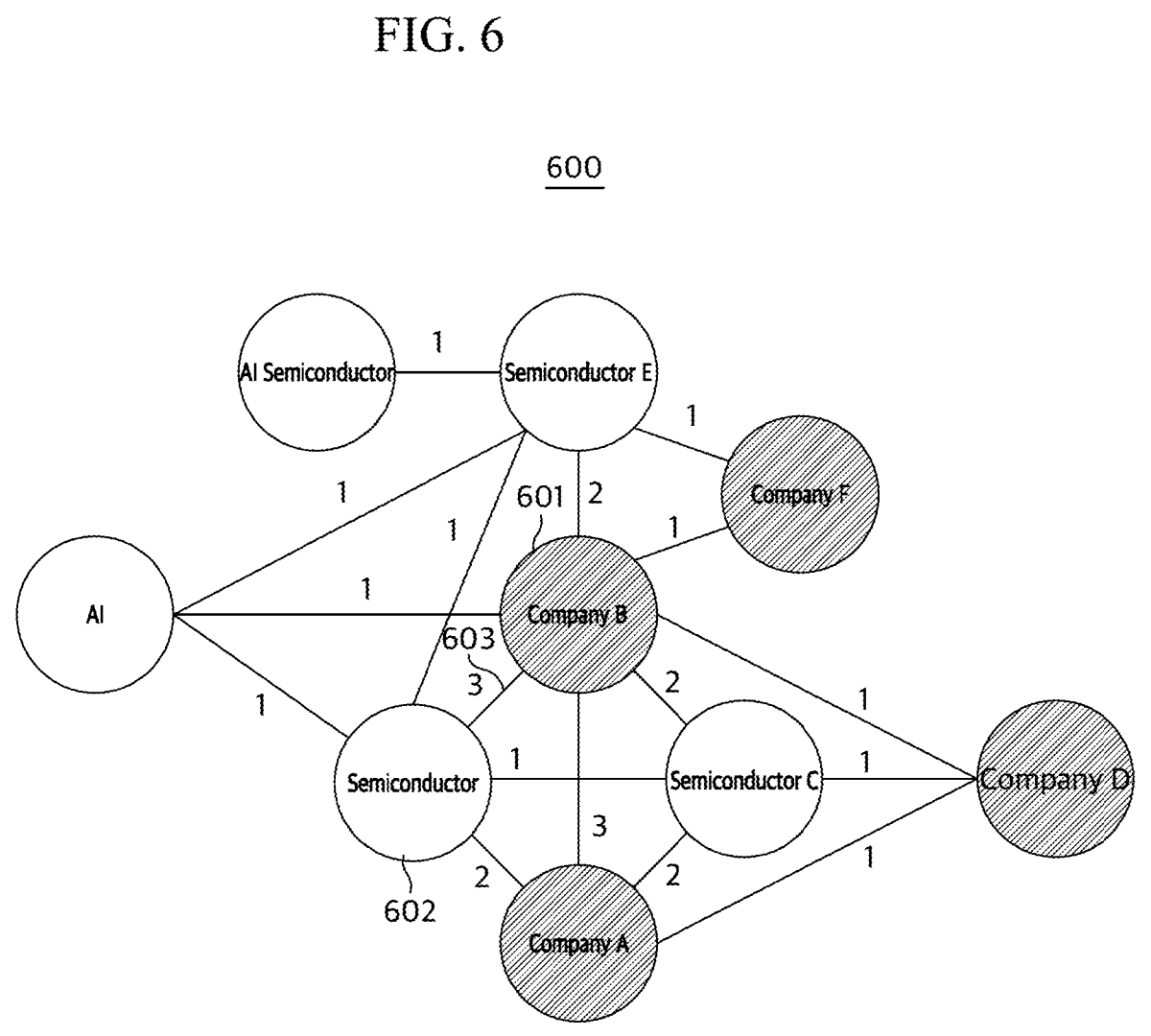

Company D
Company F
Semiconductor E
Semiconductor C
Company B
Company A
AI Semiconductor
Semiconductor
AI
601
602
603
1
1
1
1
1
2
2
2
2
3
3
1
1
1
1
1
1

| Query word \ Response word | First response word | Second response word |
|---|---|---|
| First word | Company A, Company B, Company C, Company D, Company E, Company F, Company G, Company H and Company I | Keyword A, Keyword B, Keyword C, Keyword E, Keyword F, Keyword G, Keyword H and Keyword I |
| Second word | Company A, Company G, Company I, Company B, Company J, Company K, Company L and Company M | Keyword A, Keyword C, Keyword F, Keyword I, Keyword J, Keyword K, Keyword L and Keyword M |
| [First word, Second word] | Company A, Company B, Company G and Company I | Keyword A, Keyword C, Keyword F and Keyword I |

1420

| Query word \ Response word | First response word | Second response word |
|---|---|---|
| First company | Company A, Company B, Company C, Company D, Company E, Company F, Company G, Company H and Company I | Keyword A, Keyword B, Keyword C, Keyword E, Keyword F, Keyword G, Keyword H and Keyword I |
| Second company | Company A, Company G, Company I, Company B, Company J, Company K, Company L and Company M | Keyword A, Keyword C, Keyword F, Keyword I, Keyword J, Keyword K, Keyword L and Keyword M |
| [First company, Second company] | Company A, Company B, Company G and Company I | Keyword A, Keyword C, Keyword F and Keyword I |

METHOD OF GENERATING KEYWORD INFORMATION AND AN ELECTRONIC DEVICE PERFORMING THEREOF

CROSS-REFERENCE TO RELATED APPLICATION(S)

This application claims the benefit of Korean Patent Application No. 10-2023-0077480, filed on Jun. 16, 2023, the disclosure of which is incorporated herein by reference.

BACKGROUND

Technical Field

Example embodiments relate to a method of generating keyword information and an electronic device performing the same.

Description of the Related Art

Information on stocks is provided to investors through financial news or broadcast media. Stocks may be manually classified as stocks related to a specific sector or stocks related to a specific theme. Specifically, in an investment environment where passive investment through exchanged-traded funds (ETFs) is increasing, stocks that are related to each other may have a greater tendency for their prices to fluctuate in similar patterns.

BRIEF SUMMARY

An aspect provides a method of generating keyword information to technically solve a task of providing keywords highly related to query words and an electronic device performing the same.

The technical problems to be solved by the present disclosure are not limited to the technical problems described above, and other technical problems may be inferred from the following example embodiments.

According to an aspect, there is provided a method of generating keyword information performed by an electronic device, the method including identifying a text set including at least one text element, using a named entity recognition (NER) model based on deep learning, identifying keywords in the at least one text element, based on the text set, determining degrees of association of keyword pairs included in a keyword set including the keywords, obtaining information on a query word that is input by a user, and based on at least one among the degrees of association, generating information on response words corresponding to the query word According to an example embodiment, the text set may include unstructured data related to finance, and the at least one text element may be at least one sentence in the unstructured data related to finance.

According to an example embodiment, the determining of the degrees of association may comprise, based on the text set, identifying total frequency in which the keyword pairs are included in each of the at least one text element.

According to an example embodiment, the method of generating keyword information by an electronic device may further comprise, based on the keyword set and the total frequency, determining a co-occurrence graph.

According to an example embodiment, the co-occurrence graph may include nodes and edges connecting the nodes, each of the nodes may correspond to one of the keywords included in the keyword set, and a weight of each of the edges may be identified based on total frequency in which two keywords corresponding to each of a first node and a second node that are connected to the each of the edges are included together in each of the at least one text element.

According to an example embodiment, the co-occurrence graph may be a directed weighted co-occurrence graph.

According to an example embodiment, the directed weighted co-occurrence graph may include nodes and edges connecting the nodes, each of the nodes may correspond to one of the keywords included in the keyword set, a weight of each of the edges may include at least one of a first sub weight and a second sub weight that are related to a first node and a second node that are connected to the each of the edges, the first sub weight may be identified based on first total frequency in which a keyword corresponding to the first node and a keyword corresponding to the second node are included together in each of the at least one text element and second total frequency in which the keyword corresponding to the first node is included in each of the at least one text element, and the second sub weight is identified based on the first total frequency and third total frequency in which the keyword corresponding to the second node is included in each of the at least one text element.

According to an example embodiment, generating of the information on the response words may comprise, based on the directed weighted co-occurrence graph, identifying at least one keyword related to the query word among the keywords included in the keyword set, and based on a degree of association of a keyword pair consisting of one of the at least one keyword and the query word, generating the information on the response words corresponding to the query word, wherein the degree of association of a keyword pair consisting of one of the at least one keyword and the query word may be determined through a predetermined calculation using at least one sub weight related to a node corresponding to the one of the at least one keyword and a node corresponding to the query word on the directed weighted co-occurrence graph.

According to an example embodiment, generating of the information on the response words may comprise, based on the degree of association of a keyword pair consisting of one of the at least one keyword and the query word, filtering some keywords with a low degree of association with the query word from the at least one keyword according to a set rule.

According to an example embodiment, the method of generating keyword information by an electronic device may further include identifying a keyword of a word class that is set in the at least one text element using morpheme analyzing, wherein the keyword set may further include the keyword of the word class that is set.

According to an example embodiment, identifying of the keywords may comprise identifying a category of each of the keywords, and generating of the information on the response words may comprise identifying at least one keyword related to the query word among the keywords included in the keyword set and filtering a keyword of a set category from the at least one keyword.

According to an example embodiment, the information on the response words may include at least one of information on a first text element in which the query word and one of the response words are included together in the at least one text element and information on first text data including the first text element among text data included in the text set.

According to an example embodiment, generating of the information on the response words may comprises, based on information on a sort order of the response words, sorting and providing the information on the response words, wherein the information on the sort order of the response words may be a size order of a degree of association between the query word and the response words.

According to an example embodiment, generating of the information on the response words may comprise, in case that the query word includes a plurality of query words, identifying a plurality of response word sets corresponding to each of the plurality of query words, and determining at least one keyword that is simultaneously included in the plurality of response word sets as the response words corresponding to the plurality of query words.

According to an example embodiment, the sort order of the response words may be determined based on sort rankings of the response words in each of the plurality of response word sets.

According to an example embodiment, generating of the information on the response words may comprise classifying the response words into a first response word which is a target keyword and a second response word, which is a general keyword and classifying and generating information on the first response word and information on the second response word separately, wherein the first response word may include a keyword corresponding to at least one stock that is listed on an exchange.

According to an example embodiment, generating of the information on the response words may comprise identifying first total frequency in which one of the response words is included together with the query word in each of the at least one text element and a category of the response word, and based on the first total frequency and the category, generating a page where information on the response words is displayed.

According to an example embodiment, generating of the information on the response words may comprise, among the response words, identifying a first type response word included in a first group and a second type response word included in a second group, and classifying and generating information on the first type response word and information on the second type response word separately.

According to another aspect, there is provided an electronic device including a transceiver, at least one processor and a memory configured to store one or more instructions executed by the at least one processor, wherein the at least one processor, executing the one or more instructions, is configured to identify a text set including at least one text element, using an NER model based on deep learning, identify keywords in the at least one text element, based on the text set, determine degrees of association of keyword pairs included in a keyword set including the keywords, obtain information on a query word that is input by a user, and based on at least one among the degrees of association, generate information on response words corresponding to the query word.

According to another aspect, there is provided a non-transitory computer-readable recording medium having a program for executing a method of generating keyword information.

According to example embodiments, it is possible for an electronic device to generate information on response words that have a high degree of association with a query word by using degrees of association of keyword pairs included in a keyword set. Accordingly, a user of a terminal may check the information on the response words with the high degree of association with the query word that is input through the terminal. For example, the user may check information on keywords such as companies, stock items, and industries that are highly related to the query word.

Effects of the present disclosure are not limited to those described above, and other effects may be made apparent to those skilled in the art from the following description.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE SEVERAL VIEWS OF THE DRAWINGS

These and/or other aspects, features, and advantages of the disclosure will become apparent and more readily appreciated from the following description of example embodiments, taken in conjunction with the accompanying drawings of which:

FIGS. 3 and 4 show examples of text data in a text set and text elements included in the text data according to an example embodiment;

FIGS. 5 and 6 are diagrams for explaining a co-occurrence graph generated based on a keyword set and total frequency according to an example embodiment;

FIG. 14 is a diagram for explaining a method of generating keyword information when there is a plurality of query words;

DETAILED DESCRIPTION

Figure 1:
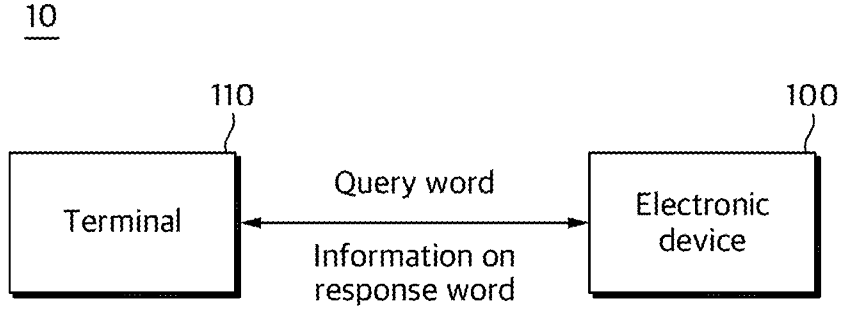
FIG. 1 shows a system according to an example embodiment.

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof.

Expression "at least one of a, b and c" described throughout the specification may include "a alone," "b alone," "c alone," "a and b," "a and c," "b and c" or "all of a, b and c."

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

Hereinafter, example embodiments of the present disclosure will be described in detail with reference to the accompanying drawings.

In describing the example embodiments, descriptions of technical contents that are well known in the technical field to which the present disclosure pertains and that are not directly related to the present disclosure will be omitted. This is to more clearly convey the gist of the present disclosure without obscuring the gist of the present disclosure by omitting unnecessary description.

For the same reason, some elements are exaggerated, omitted or schematically illustrated in the accompanying drawings. In addition, the size of each element does not fully reflect the actual size. In each figure, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below, and may be implemented in various different forms. The example embodiments are provided only so as to render the present disclosure complete, and completely inform the scope of the present disclosure to those of ordinary skill in the art to which the present disclosure pertains. The present disclosure is only defined by the scope of the claims. Like reference numerals refer to like elements throughout.

In this case, it will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

In the present disclosure, a text set may be a set of unstructured data related to finance. Further, text data in the text set may be unstructured data related to finance. The finance-related unstructured data may include finance-related text data, and the finance-related unstructured data may include at least one of finance-related news and finance-related blogs. In addition to the finance-related text data exemplified above, the finance-related unstructured data may include various types of finance-related text data distributed through Internet networks. In various example embodiments, the text set may not include certain types of finance-related unstructured data. For example, finance-related text data including content—content that simply lists multiple stocks with low mutual degrees of association—that is irrelevant to the correlation among the multiple stocks may be filtered out from being included in the text set. For example, market news simply lists information about the stock list and the rate of return for each stock within the stock list, and thus it may be inappropriate to classify stocks included in market news as related to stocks. Similarly, it may be inappropriate to classify stocks included in advertising news related to financial products as related stocks. In other words, the finance-related unstructured data including at least one of market news or advertising news may be filtered and not be included in the text set. In the present disclosure, it is explained that the content related to the text set includes unstructured data related to finance, but it is not limited thereto. It may be similarly applied to text sets including unstructured data related to specific fields other the finance.

In the present disclosure, a text element may refer to a sentence within unstructured data related to finance. In various example embodiments, among sentences in unstructured data related to finance, certain types of sentences may not correspond to a text element. For example, among sentences in finance-related unstructured data, sentences that correspond to a set type may be filtered, and only the remaining unfiltered sentences may correspond to the text elements. For example, the set type of sentence may be a sentence including at least one of a phrase related to market conditions or a phrase related to advertising.

In the present disclosure, a keyword is an important word within a text element, and the keyword may refer to an important word identified or extracted within at least one text element through various means, such as an NER model, a morpheme analysis model and user settings. For example, the keyword may be an important word related to finance within the at least one text element. Further, a keyword set may indicate a set of important words within the at least one text element. For example, the keyword set may be a set of important words related to finance within at least one text element. The keyword set may include one or more keywords.

Each keyword included in the keyword set may be classified as either a target keyword or a general keyword depending on whether the keyword is a stock name or a financial product name listed on a specific exchange.

The target keyword may indicate a stock name listed on a specific exchange or a keyword corresponding to a financial product name among keywords included in the keyword set. Further, the target keyword set may refer to a set of keywords corresponding to stock names listed on a specific preset exchange or a set of keywords corresponding to the same type of financial product name. For example, when the target keyword set is a set of stocks listed on the Korean exchange, the target keyword may be a stock name of a company listed on one of "Korea Composite Stock Price Index (KOSPI) market," "Korean Securities Dealers Automated Quotations (KOSDAQ) market" and "Korea New Exchange (KONEX) market" among the keywords in at least one text element. Further, when the target keyword set is a set of stocks listed on a specific virtual asset exchange, the target keyword may be one of the names of virtual assets listed on a specific virtual asset exchange, such as "Bitcoin" and "Ethereum," among keywords within at least one text element. In the present disclosure, it is explained that the target keyword includes a stock name and/or a virtual asset name, but it is not limited thereto. The target keywords may be names of various financial products such as "raw materials," "corporate bonds" and "government bonds." Further, the target keyword set that is preset may be updated periodically. For example, as new stocks are listed or existing stocks are delisted on a specific exchange, stocks listed on the specific exchange may be updated and accordingly, the keyword set may be updated.

The general keyword may refer to a keyword included in the keyword set that is neither a stock name nor a financial product name listed on the specific exchange. In other words, the general keyword may be any keyword included in the keyword set, excluding the target keyword. For example, among keywords included in the keyword set, "semiconductor" is neither a stock name nor financial product name listed on a specific exchange, and thus the word may be classified as a general keyword.

Depending on how the electronic device identifies or extracts keywords from text elements, each keyword included in the keyword set may be classified as one of a first keyword, a second keyword and a third keyword. However, the present disclosure is not limited thereto, and keyword types may be added or omitted depending on how keywords are identified or extracted.

The first keyword is a keyword included in a sentence in finance-related unstructured data, and may be identified through a NER model. In an example embodiment, the NER model may be a model based on deep learning. The NER model may be a model that can recognize entities with names that refer to specific objects within specified text.

The second keyword may be a keyword included in a predetermined financial keyword set among keywords of a set word class included in sentences within finance-related unstructured data identified through morpheme analysis. Here, the set word class may be noun. Further, the predetermined financial keyword set may be a dictionary composed of preset important finance-related words. Here, the important finance-related words may be major market indices such as "interest rate" and "exchange rate." Further, the predetermined financial keyword set may include important words related to finance that are relatively recent, such as "Bitcoin" and "Metaverse." These recently generated important words related to finance may not be well identified through a named entity model, and thus such words may be identified as a second keyword by setting the words to be included in the financial keyword set.

The third keyword may be a keyword of which frequency of appearance in the latest text data is increased rapidly. More specifically, among the keywords of a set word class included in sentences in finance-related unstructured data identified through morpheme analysis, a third keyword may be a keyword that is not included in the set financial keyword set, but is detected to have a sharp increase in the frequency of appearance in the latest text data. If the frequency of a specific word appearing in a text element included in recently generated text data increases rapidly, the specific word may be identified as a third keyword. For example, if a particular presidential candidate makes a hot topic by announcing a pledge related to "hair loss" prior to the presidential election, the number of economic news stories with "hair loss" as a keyword may increase rapidly during a certain period, for example, within the past month. In this case, since "hair loss" is generally a word with a low financial degree of association, it may not be set to be included in the financial keyword set and may not be identified as a second keyword. However, "hair loss" may be identified as a third keyword because "hair loss" is detected to have a sharp increase in the frequency of its appearance recently. Because of this, when the frequency of appearance of a specific word rapidly increases as an important event occurs, the specific word may be quickly incorporated into the keyword set by being identified as a third keyword.

In the present disclosure, the query word may be a word input by a user through a terminal of the user for search. The query word input through the terminal is not limited to one query word, and the query word input through the terminal may be composed of multiple query words.

In the present disclosure, the response word may be a word output in response to an input of a query word from the user. The response word may be a word with a high degree of association with the query word among keywords included in the keyword set. The response word may consist of at least one of a first response word, which is a target keyword, and a second response word, which is a general keyword.

Hereinafter, example embodiments of the present disclosure will be described in detail with reference to the drawings.

FIG. 1 shows a system according to an example embodiment.

Referring to FIG. 1, a system 10 according to various example embodiments may be implemented by various types of device. For example, the system 10 may include an electronic device 100 and a terminal 110. Those skilled in the art can understand that other general-purpose elements may be included in addition to the elements illustrated in FIG. 1.

According to an example embodiment, the electronic device 100 may identify a text set including at least one text element. Here, the text set may be a set of finance-related unstructured data stored in a memory within the electronic device 100 or stored on a server (not illustrated). The electronic device 100 may identify keywords in at least one text element. The keywords within at least one text element may include a first keyword identified through a deep learning-based NER model.

According to an example embodiment, the electronic device 100 may determine degrees of association of keyword pairs based on the text set. In the present disclosure, a keyword pair may indicate any two keywords in a keyword set. According to an example embodiment, before determining degrees of association of keyword pairs included in a keyword set, the electronic device 100 may first identify the keyword pairs included in the keyword set. In an example embodiment, the electronic device 100 may first identify a sub keyword set with in the keyword set, and may identify any two keywords in the sub keyword set as a keyword pair. For each text element, the sub keyword set may be understood as a set of keywords that are simultaneously included within each text element. When a sub keyword set is first identified and degrees of association of keyword pairs each consisting of any two keywords within sub keywords are determined, computational efficiency may be increased, when compared to the case where degrees of association of keyword pairs each consisting of any two keywords in a keyword set are determined.

The degree of association of a keyword pair is a value based on the frequency of the keyword pair appearing together in at least one text element, and may be a value indicating the correlation between two keywords included in the keyword pair. For example, when the frequency of two random keywords appearing together in one text element is relatively high, the degree of association of a keyword pair consisting the two keywords may have a relatively high value, and the relevance between the two keywords may be understood to be relatively high.

According to an example embodiment, the electronic device 100 may obtain information on a query word input by a user. According to an example embodiment, the electronic device 100 may generate information on a response word corresponding to the query word based on at least one among degrees of association of keyword pairs. The query word is not limited to one word and the query word may include a plurality of words. According to an example embodiment, if the query word includes multiple words, the electronic device 100 may identify a plurality of response word sets corresponding to each of the multiple words, and may individually provide information on the plurality of response word sets according to each of the multiple words.

According to another example embodiment, when the query word includes multiple words, the electronic device 100 may identify a plurality of response word sets corresponding to each of the multiple words, and determine at least one keyword simultaneously included in the plurality of response word sets as a response word, and provide information on the response word.

When a query of a user input through the terminal 110 is in a word form, the electronic device 100 may identify a query word based on the query of the user received through the terminal 110. However, the query of the user input through the terminal 110 is not limited to the word form. For example, when the query of the user input through the terminal 110 is in a form of sentence, the electronic device 100 may identify the query word by which the user wishes to make the query by analyzing the context of the query in the form of sentence.

The terminal 110 may receive a user input through an input interface, and may transmit an output corresponding to the input of the user to the electronic device 100 through an output interface or display the output on a screen of the terminal 110. For example, the terminal 110 may receive a user input related to the query word through the input interface, and may transmit an output related to the query word to the electronic device 100 through the output interface. The electronic device 100 may transmit information on a response word corresponding to the query word to the terminal 110, and the terminal 110 may receive information on the response word from the electronic device 100. The response word may include at least one of a target keyword and a general keyword. For example, the electronic device 100 may classify the response word into a first response word, which is a target keyword, and a second response word, which is a general keyword, and the electronic device 100 may classify information on the first response word and information on the second response word and provide the information to the terminal 110.

Each of the electronic device 100 and the terminal 110 may include a transceiver, a memory and a processor. Further, each of the electronic device 100 and the terminal 110 refers to a unit that processes at least one function or operation, and this may be implemented through hardware, software or a combination of hardware and software. Meanwhile, throughout the present disclosure, each of the electronic device 100 and the terminal 110 is referred to as a physically separate device or server, but may have a logically divided structure, and at least some of these may be implemented as separate functions on a single device or server.

According to an example embodiment, the electronic device 100 and the terminal 110 may include a number of computer systems or computer software implemented as network servers. For example, at least one of the electronic device 100 and the terminal 110 may refer to a computer system and computer software that is connected to subordinate devices that can communicate with other network servers over a computer network, such as an intranet or the Internet, to receive requests to perform tasks, and performs operations thereof and provides results. In addition, thereto, at least one of the electronic device 100 and the terminal 110 may be understood as a broad concept including a series of applications that can run on a network server and various databases built internally or on other connected nodes. For example, at least one of the electronic device 100 and the terminal 110 may be implemented using network server programs that are provided in various ways depending on the operating system, such as DOS, Windows, Linux, UNIX or MacOS.

The electronic device 100 and the terminal 110 may communicate with each other through a network (not illustrated). Networks include local area networks (LAN), wide area networks (WAN), value added networks (VAN), mobile radio communication networks, satellite communication networks and combinations thereof. The networks are comprehensive data communication networks that allow each network constituent illustrated in FIG. 1 to communicate smoothly with each other. The networks may include wired Internet, wireless Internet and mobile wireless networks. Wireless communications may include, for example, wireless LAN (Wi-Fi), Bluetooth, Bluetooth low energy, ZigBee, Wi-Fi Direct (WFD), ultra wideband (UWB), infrared data association (IrDA) and near field communication (NFC), but the wireless communications are not limited thereto.

Figure 2:
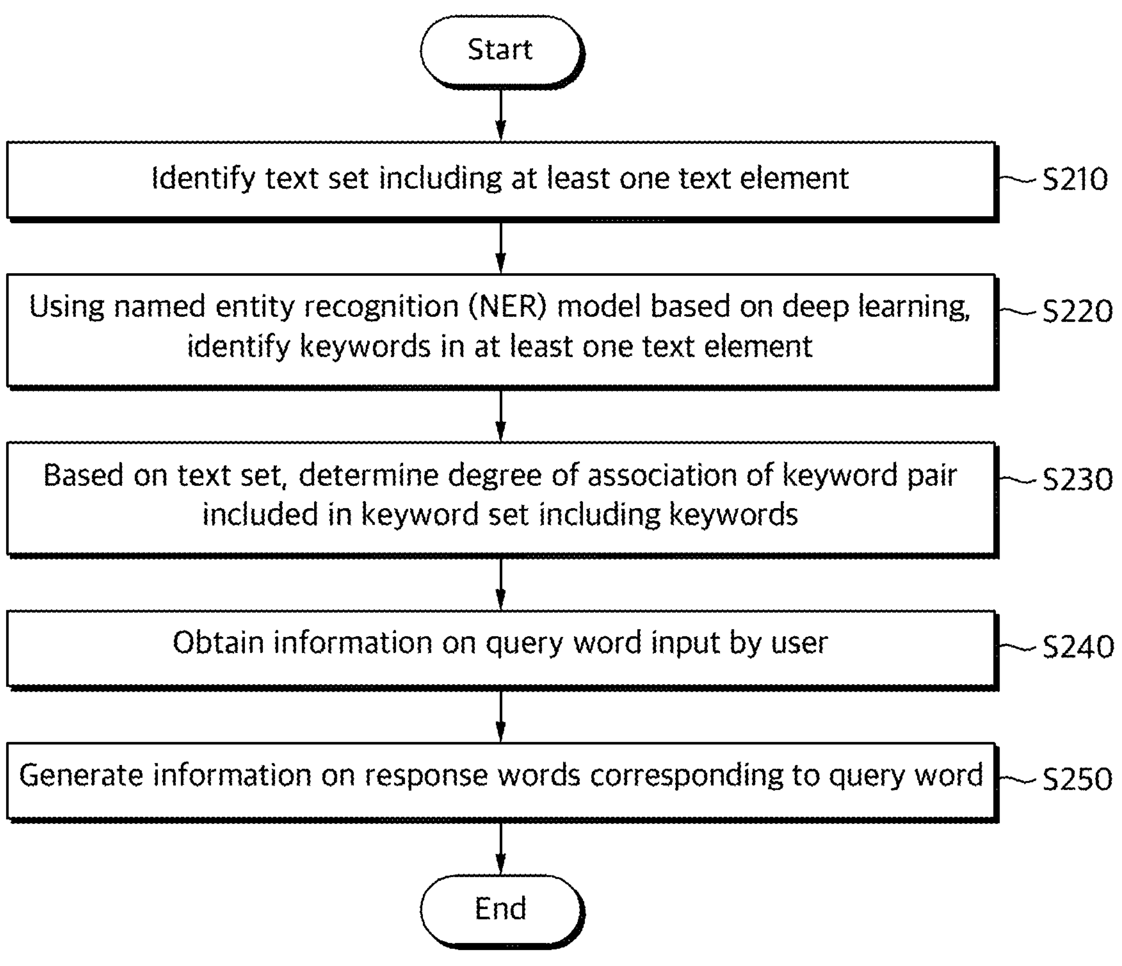
FIG. 2 is a flowchart showing a method for generating keyword information.

FIG. 2 is a flowchart showing a method for generating keyword information.

Referring to FIG. 2, within the scope of what is clearly understood by those skilled in the art to which the present disclosure pertains, it is apparent that for each operation in which an electronic device generates keyword information, some operations may be changed or replaced, or some sequences between operations may be changed.

In operation S210, the electronic device may identify a text set including at least one text element.

The text set may be a set of unstructured data related to finance. The text set may be a text set including text data generated within a set period of time. Time when the text data is generated may be one of the time that the text data was first generated and the time that the text data was last modified. Further, the text element may correspond to one of sentences included in the finance-related unstructured data.

In operation S220, the electronic device may identify keywords in at least one text element using a named entity recognition (NER) model based on deep learning.

The keywords may include a first keyword identified through the deep learning-based NER model. According to various example embodiments, keywords identified within at least one text element by the electronic device 100 may further include at least one of a second keyword and a third keyword in addition to the first keyword. The second keyword or the third keyword may be a keyword of a set word class within at least one text element identified using morpheme analysis. The first keyword, the second keyword or the third keyword may be classified according to the way the electronic device identifies or extracts the keyword within the text element. A set of keywords including the first keyword, the second keyword or the third keyword identified in operation S220 may be understood as the same as a keyword set.

The first keyword is a keyword corresponding to a named entity in at least one text element, and may be identified through a NER model based on deep learning. Here, the named entity may represent a term that refers to a specific object. For example, a term referring to a specific object, such as a specific person, a specific region, a specific organization or a specific country, may be a named entity. Further, the NER model according to one example embodiment may be trained based on big data in Korean, but keywords in the present disclosure are not limited to Korean. In other words, in the present disclosure, the NER model may be trained based on big data in various languages, including English, Chinese and Japanese in addition to Korean, and keywords of the present disclosure according thereto may include keywords in various languages.

As named entities within text elements are identified through the NER model based on deep learning, new words that appear less frequently in text data, long words and mixed words may also be classified as first keywords. Further, named entities within text elements and categories for each named entity may also be identified through the NER model based on deep learning. For example, when "Keyword A" is a homonym and can mean both a name of a region and a name of an organization, by analyzing the context of the text element including "Keyword A," the electronic device 100 may classify "Keyword A" differently into "Keyword A" in a "region" category and "Keyword A" in an "organization" category.

The second keyword may be a keyword included in a predetermined financial keyword set among the keywords of a set word class included in sentences in finance-related unstructured data identified through morpheme analysis. Here, the set word class may be noun. Further, the predetermined financial keyword set may be a dictionary composed of preset important finance-related words. The finance-related keywords may not be named entities, but may be words that need to be identified as finance-related keywords. For example, keywords related to finance may include major indices or financial terms in the financial market, such as "interest rate," "exchange rate," "acquisition" and "acquired." With regard thereto, immediately after acquisition-related news is announced, the stock price of the acquired company may generally rise, and the stock price of the acquiring company may generally fall. In other words, when the query word is "acquired," providing information on the acquired company within a specific exchange as information on the response word may provide useful information to the user of the terminal 110.

The third keyword may be a keyword of which frequency of appearance in the latest text data is increased rapidly. More specifically, the third keyword may be a keyword that is not included in the predetermined financial keyword set but has a sharp increase in the frequency of appearance in the latest text data, among the keywords of a set word class included in sentences in finance-related unstructured data identified through morpheme analysis.

Each keyword identified within at least one text element may be classified as either a target keyword or a general keyword depending on whether the keyword is a stock or financial product listed on a specific exchange. For example, if the keyword is the stock name of a company listed on one of the "KOSPI market," "KOSDAQ market" and "KONEX market" among the keywords within at least one text element, the keyword may be classified as a target keyword corresponding to the stock listed on one of the Korean exchange markets. Further, based on that the stock name of a company listed on one of the "KOSPI market," "KOSDAQ market" and "KONEX market" is a named entity and is identified by the NER model based on deep learning, the keyword may be both the first keyword and the target keyword. Further, for example, if the keyword is "interest rate," a major finance-related word, the keyword may be a second keyword and a general keyword.

When the keyword is a homonym, the electronic device 100 may analyze the context of the text element including the keyword, and thus the electronic device 100 may determine the keyword to be one of multiple homonyms. When a specific keyword refers to a stock listed on a specific exchange among multiple homonyms, the specific keyword may be classified as a target keyword. When the specific keyword is a stock listed on a specific exchange among multiple homonyms or has a meaning other than a financial product, the specific keyword may be classified as a general keyword.

According to an example embodiment, the electronic device 100 may further identify categories for each of keywords within at least one text element. More specifically, for each identified keyword within at least one text element, the electronic device 100 may identify a keyword category among a plurality of preset categories. Here, some of the plurality of preset categories may be “Person,” “Location,” “Organization,” “Artifact,” “Date,” “Time,” “Country,” “Animal,” “Plant,” “Quantity,” “Study-field,” “Theory,” “Event,” “Material,” “Term” and “Custom dictionary,” but the category is not limited thereto. For example, some of the listed categories may be omitted, or not listed additional categories may be added. Here, among the plurality of categories, the user-specified dictionary or “Custom dictionary” may be a category corresponding to a second keyword or a third keyword.

In operation S230, based on the text set, the electronic device may determine the degree of association of keyword pairs included in the keyword set including keywords.

According to an example embodiment, the electronic device 100 may identify the total frequency in which a keyword pair is included together in each of at least one text element based on the text set. Based on the keyword set and the total frequency, the electronic device 100 may determine a co-occurrence graph. The co-occurrence graph may include nodes and edges. The node may be understood as representing each keyword, and the edge is expressed as a line connecting two nodes and may be understood as indicating that two keywords corresponding to the two nodes are included together in one text element. The weight of an edge may represent the total frequency of two keywords corresponding to two nodes connected to an edge being included together in at least one text element. With regard thereto, the degree of association of the keyword pair may be expressed as the weight of the edge between two nodes corresponding to the keyword pair in the co-occurrence graph, and the weight of an edge between two nodes corresponding to a keyword pair may be determined based on the total frequency of the keyword pair being included together in at least one text element.

According to an example embodiment, the co-occurrence graph may further include information on the direction of degree of association of the keyword pair. The co-occurrence graph may be referred to as a directed weighted co-occurrence graph. The directed weighted co-occurrence graph may also include nodes and edges. The node may be understood as representing each keyword, and the edge is expressed as a line connecting two nodes and may be understood as indicating that two keywords corresponding to the two nodes are included together in one text element. Regarding a first node and a second node connecting to an edge, the weight of an edge in the directed weighted co-occurrence graph may be based on a first sub weight from the first node to the second node or a second sub weight from the second node to the first node. With regard thereto, the degree of association of the keyword pair may be determined through a predetermined calculation by using the first sub weight or the second sub weight between two nodes corresponding to the keyword pair in the directed weighted co-occurrence graph. For example, the predetermined calculation may be multiplying the first sub weight by the second sub weight.

In operation S240, the electronic device may obtain information on a query word input by the user.

According to an example embodiment, the electronic device 100 may receive an input of the user related to a query word from the terminal 110 of the user. The input of the user related to the query word may be received from the user through an input interface of the terminal 110, and the input may be transmitted to the electronic device 100 through an output interface of the terminal 110. The electronic device 100 may receive the user input related to the query word and identify the query word. The electronic device 100 identifying a query word may be understood to include identifying a keyword for the query word within a keyword set. In the present disclosure, a keyword for a query word may be referred to as a query keyword, and single query word may correspond to more than one query keyword.

In operation S250, based on at least one of degrees of association, the electronic device 100 may generate information on response words corresponding to the query word. More specifically, the electronic device 100 may identify a query word, may identify a response word corresponding to the query word based on at least one degree of association, and provide information on the response word to the terminal of the user.

According to an example embodiment, the electronic device 100 may identify a response word corresponding to a query word based on at least one degree of association. The degree of association may be based on a co-occurrence graph or a directed weighted co-occurrence graph. In other words, the electronic device may identify the response word corresponding to the query word based on the co-occurrence graph or the directed weighted co-occurrence graph. According to an example embodiment, the degree of association may be at least one. In other words, the query keyword may correspond to a first node in the co-occurrence graph or the directed weighted co-occurrence graph, and there may be n number of nodes that are connected to the first node. In this case, query keywords may consist of n number of keywords and n number of keyword pairs, and the number of degrees of association may be n. In other words, based on at least one of the degrees of association, which is a numerical value indicating the degree of relationship of a keyword pair, the electronic device 100 may identify or determine the response word corresponding to the query word.

According to an example embodiment, based on at least one of degrees of association, the electronic device 100 may identify some keywords with a relatively high degree of association as response keywords and may identify or determine a response word corresponding to the response keywords. In the present disclosure, a response keyword may be understood as a keyword corresponding to a response word. In an example embodiment, based on at least one of degrees of association, the electronic device may filter some keywords according to set rules. For example, one of the set rules may be filtering the bottom N % keywords or M number of keywords with a low degree of association. Through the filtering, the electronic device may identify some keywords with a relatively high degree of association as response keywords, and may identify or determine a response word.

According to another example embodiment, the electronic device may identify some keywords excluding specific categories as response keywords based on at least one of the degrees of association, and may identify or determine a response word corresponding to the response keywords. For example, the specific categories may include at least one of a date-related category, a time-related category and a country-related category.

According to an example embodiment, in addition to a list of response words, information on the response word may further include at least one of information on a first text element including both query word and response word in at least one text element and information on first text data including the first text element in the text data included in the text set. In other words, the electronic device 100 may provide a response word together with information on a text element that is the basis for a high degree of association with a query word or information on the text data.

Figure 3:
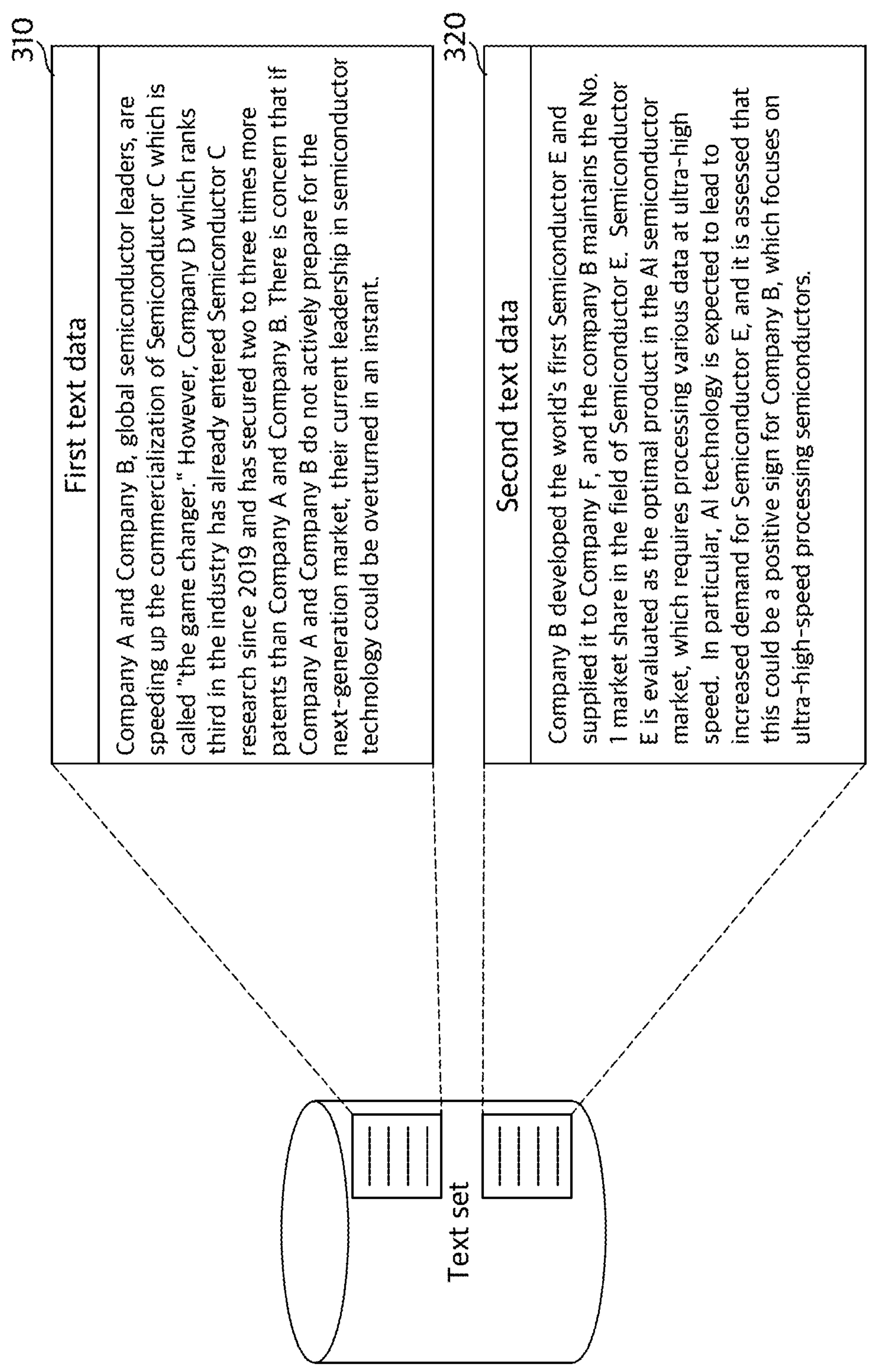

FIGS. 3 and 4 show examples of text data in a text set and text elements included in the text data according to an example embodiment.

According to an example embodiment, the text set may include first text data 310 and second text data 320 in the finance-related unstructured data. Here, the finance-related unstructured data is finance-related text data, and the finance-related text data may include at least one of finance-related news or finance-related blogs. With regard thereto, the electronic device 100 may crawl finance-related unstructured data periodically or aperiodically from sites where finance-related unstructured data is uploaded. The first text data 310 and the second text data 320 in FIG. 3 represent parts of crawled text data. Meanwhile, in an example embodiment, text data subject to crawling may include news of specific categories, and for example, news included in the "Economy" category may be included. Further, in an example embodiment, crawled text data may be preprocessed before subsequent analysis. The crawled text data may be processed through preprocessing to exclude duplicate articles and identify texts that are actually mentioned more often. Details related to the preprocessing will be described with reference to FIGS. 17 and 18.

Text elements within the text data may be distinguished based on the period, which comes right after the final word. The first text data 310 may include three sentences which are a first text element 410, a second text element 420 and a third text element 430. Further, the second text data 320 may include three sentences which are a fourth text element 440, a fifth text element 450 and a sixth text element 460.

According to an example embodiment, for each of at least one text element, the electronic device 100 may identify keywords within text elements through a deep learning-based NER model or morpheme analysis model, and the electronic device 100 may classify the identified keywords into one of a first keyword, a second keyword and a third keyword. Further, depending on whether an identified keyword is a stock or a financial product listed on a specific exchange, the electronic device 100 may classify the identified keyword into a target keyword or a general keyword. A keyword set may consist of keywords within at least one text element. Referring to FIG. 3, a keyword set identified based on the text set may include keywords such as "Company A," "Company B," "Company D," "Company F," "Semiconductor," "Semiconductor C," "Semiconductor E," "AI Semiconductor" and "AI." A keyword set may include at least one sub keyword set corresponding to at least one text element, and the sub keyword set may be composed of keywords within one corresponding text element. Further, the electronic device 100 may identify categories for each keyword within at least one text element.

The sub keyword set corresponding to the first text element 410 may be composed of keywords included in the first text element 410 which are "Company A," "Company B," "Semiconductor" and "Semiconductor C." More specifically, "Company A," "Company B," "Semiconductor" and "Semiconductor C" are terms referring to specific objects identified through the NER model and may be first keywords. "Company A" and "Company B" may be named entities with a category of "Organization." When "Company A" and "Company B" are stocks listed on a specific exchange, "Company A" and "Company B" are first keywords, and at the same time target keywords. Each of "Semiconductor" and "Semiconductor C" is used as a term referring to a specific material of which electrical conductivity is intermediate between that of a conductor and an insulator at room temperature or semiconductor used for a specific purpose called C. Thus, "Semiconductor" and "Semiconductor C" can be named entities with category "Material." Since "Semiconductor" and "Semiconductor C" are not stocks listed on a specific exchange, "Semiconductor" and "Semiconductor C" may be the first keywords and general keywords.

According to an example embodiment, performing an operation similar to the operation of identifying keywords included in the first text element 410 through the NER model, the electronic device 100 may identify keywords included each of the second text element 420, the third text element 430, the fourth text element 440, the fifth text element 450 and the sixth text element 460. Each identified keyword may be classified as either a target keyword or a general keyword depending on whether the keyword is a stock or a financial product listed on a specific exchange. Each of the identified keywords may be classified into one of a first keyword, a second keyword and a third keyword depending on how the keyword is identified or extracted from the electronic device 100.

Figure 5:
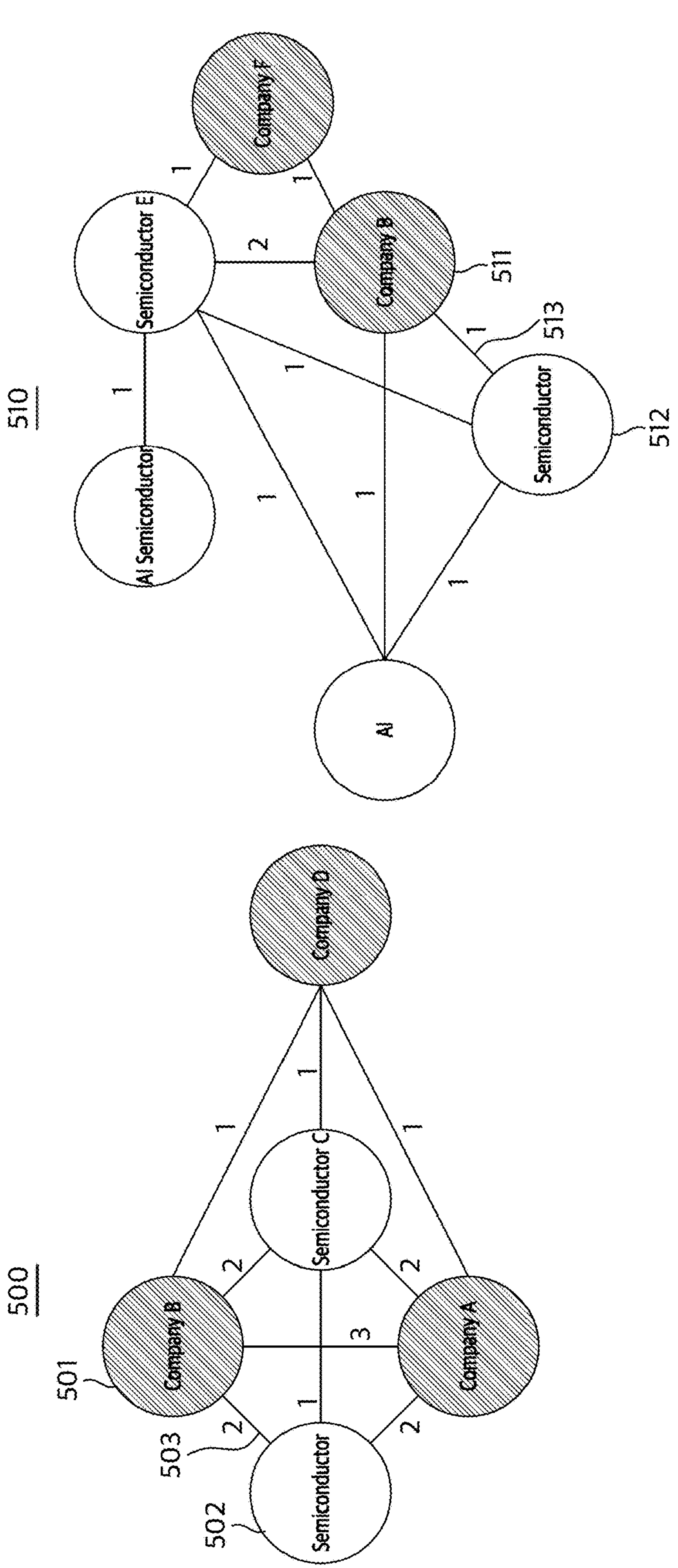

FIGS. 5 and 6 are diagrams for explaining a co-occurrence graph generated based on a keyword set and total frequency according to an example embodiment.

According to an example embodiment, a node in a co-occurrence graph may correspond to one of the keywords included in the keyword set. Further, the weight of an edge in a co-occurrence graph may be the total frequency in which a keyword pair corresponding to two nodes connected to the edge is included together in at least one text element. Referring to FIGS. 5 and 6, among nodes in the co-occurrence graphs, nodes corresponding to a target keyword may be displayed as shaded on the co-occurrence graphs.

Referring to FIG. 5, a co-occurrence graph 500 may be a graph that is determined based on the first text element 410, the second text element 420 and the third text element 430 included in the first text data 310 illustrated in FIGS. 3 and 4. The keywords included in the first text data 310 may be "Company A," "Company B," "Company D," "Semiconductor" and "Semiconductor C." Further, the target keywords included in the first text data 310 may be "Company A," "Company B" and "Company D."

The first text element 410 may be "Company A and Company B, global semiconductor leaders, are speeding up the commercialization of Semiconductor C which is called 'the game changer.'" Keywords in the first text element 410 may be "Company A," "Company B," "Semiconductor" and "Semiconductor C." The weights of the edges between a node corresponding to "Company A," a node 501 corresponding to "Company B," a node 502 corresponding to "Semiconductor" and a node corresponding to "Semiconductor C" may be increased by 1 based on the first text element 410. As a similar operation is performed for the second text element 420 and the third text element 430, in the co-occurrence graph 500, the weights of edges between nodes corresponding to keywords in the second text element 420 and the third text element 430 may be cumulatively increased by 1. Accordingly, the co-occurrence graph 500 may be illustrated as shown in FIG. 5.

In an example embodiment, "Company B" and "Semiconductor" are not included together in the second text element 420, but may be included together in the first text element 410 and the third text element 430. The weight of an edge 503 between the node 501 corresponding to "Company B" and the node 502 corresponding to "Semiconductor" in the co-occurrence graph 500 may be 2. Except for the weight of the edge 503 in the co-occurrence graph 500, the weight of other edges may be similarly determined. For example, "Company A" and "Company B" may be target keywords included in all the first text element 410, the second text element 420 and the third text element 430. In other words, the weight of the edge between the node corresponding to "Company A" and the node corresponding to "Company B" may be calculated as 3, which is the total frequency that "Company A" and "Company B" are included in each of the first text element 410, the second text element 420 and the third text element 430.

Referring to FIG. 5, a co-occurrence graph 510 may be a graph determined based on the fourth text element 440, the fifth text element 450 and the sixth text element 460 included in the second text data 320. Keywords included in the second text data 320 may be "Company B," "Company F," "Semiconductor," "Semiconductor E," "AI Semiconductor" and "AI." Further, target keywords included in the second text data 320 may be "Company B" and "Company F."

The sixth text element 460 may be "In particular, AI technology is expected to lead to increased demand for Semiconductor E, and it is assessed that this could be a positive sign for Company B, which focuses on ultra-high-speed processing semiconductors." Keywords in the sixth text element 460 may be "Semiconductor E," "AI," "Semiconductor" and "Company B." The weights of edges between a node corresponding to "Semiconductor E," a node corresponding to "AI," a node 512 corresponding to "Semiconductor" and a node 511 corresponding to "Company B" may be increased by 1 based on the sixth text element. As a similar operation is performed for the fourth text element 440 and the fifth text element 450, in the co-occurrence graph 510, the weights of the edges between nodes corresponding to the keywords in the fourth text element 440 and the fifth text element 450 may be cumulatively increased by 1. Accordingly, the co-occurrence graph 510 may be illustrated as shown in FIG. 5.

According to an example embodiment, "Company B" and "Semiconductor" are included together in the sixth text element 460, but may not be included together in each of the fourth text element 440 and the fifth text element 450. Accordingly, the weight of an edge 513 between the node 511 corresponding to "Company B" and the node 512 corresponding to "Semiconductor" in the co-occurrence graph may be 1. Except for the weight of the edge 513 in the co-occurrence graph 510, the weight of other edges may be similarly determined. For example, "Company B" and "Semiconductor E" may be included in the fourth text element 440 and the sixth text element 460. In other words, the weight of the edge between the node 511 corresponding to "Company B" and the node corresponding to "Semiconductor E" may be calculated as 2, which is the total frequency that "Company B" and "Semiconductor E" are included in each of the fourth text element 440 and the sixth text element 460.

Referring to FIG. 6, a co-occurrence graph 600 may be a graph determined based on the first text element 410, the second text element 420 and the third text element 430 included in the first text data 310, and the fourth text element 440, the fifth text element 450 and the sixth text element 460 included in the second text data 320 illustrated in FIGS. 3 and 4.

According to an example embodiment, the weight of an edge in the co-occurrence graph may be the total frequency that a pair of keywords corresponding to two nodes connected to the edge are included together in at least one text element. For example, the weight of an edge 603 between a node 601 corresponding to "Company B" and a node 602 corresponding to "Semiconductor" in the co-occurrence graph 600 may be calculated as 3, which is the sum of 2, which is the weight of the edge 503 in the co-occurrence graph 500, and 1, which is the weight of the edge 513 in the co-occurrence graph 510. The weights of other edges of the co-occurrence graph 600 may also be identified following a similar process.

In another example embodiment, weights may be given to the text data itself based on the time when the text data was generated. For example, in the text data set, greater weight may be given to text data of which generation time is more recent and text data that is generated later may be given a smaller weight. In this case, response words associated with query words may be more appropriately identified. For example, the industry of a specific company may change after a certain point in time, and different weights may be given depending on the time when the text data is generated. Accordingly, when a specific company is input as a query word, the electronic device 100 may identify the industry after the change as a response word of a higher degree of association with the query word compared to the industry before the change. In other words, when there is a difference in the time when the first text data 310 and the second text data 320 were generated, different weights may be set for the first text data 310 and the second text data 320. In the present disclosure, the weight given to text data depending on the generation time may be defined as the first weight, and a co-occurrence graph identified further based on the first weight may be referred to as a weighted co-occurrence graph.

According to an example embodiment, the electronic device 100 may determine the first weight of each text data based on information about the generation time of each text data in the text set. Further, based on the total frequency and the first weight, the electronic device 100 may identify the modified total frequency for each keyword pair included in the keyword set. Here, the modified total frequency may be determined through a predetermined calculation using the total frequency and the first weight. For example, the predetermined calculation may be multiplying the total frequency by the first weight.

In an example embodiment, 2 may be set as the first weight for the first text data 310 in the text set illustrated in FIG. 3, and 1 may be set as the first weight in the second text data 320. Here, the electronic device 100 may identify the modified weight of the edge between two nodes corresponding to "Semiconductor" and "Company B" as the modified total frequency based on the weighted co-occurrence graph. For example, the modified weight of the edge between two nodes corresponding to "Semiconductor" and "Company B" may be calculated as 5, which is the sum of 1) 4 which is the product of 2, the weight of the edge 503, and 2, the first weight of the first text data 310 in the co-occurrence graph 500 and 2) 1 which is the product of 1, the weight of the edge 513, and 1, the first weight of the second text data 320 in the co-occurrence graph 510.

Figure 7:
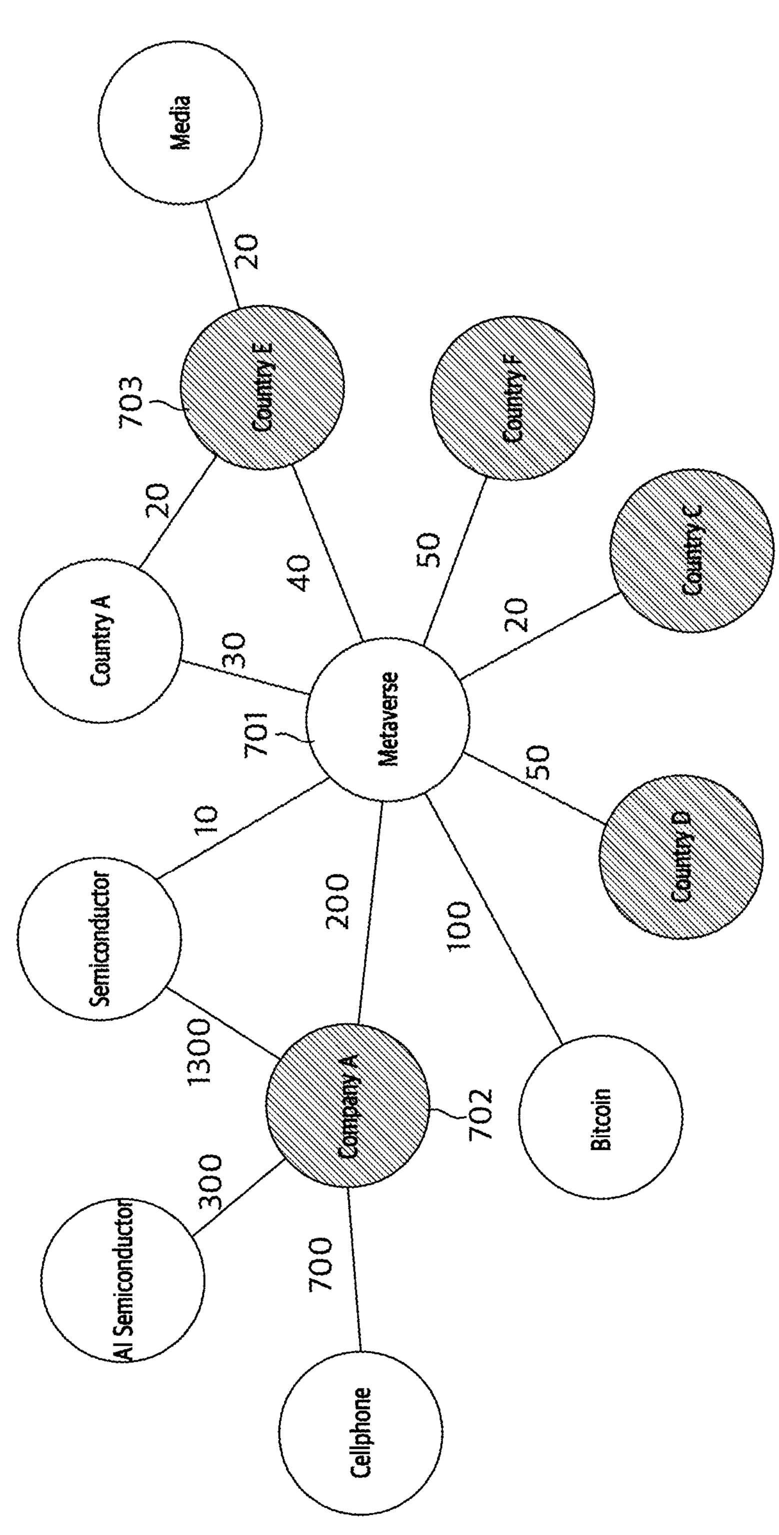
FIG. 7 is a diagram for explaining a co-occurrence graph generated based on a keyword set and total frequency according another example embodiment.

FIG. 7 is a diagram for explaining a co-occurrence graph generated based on a keyword set and total frequency according to another example embodiment.

Figure 8:
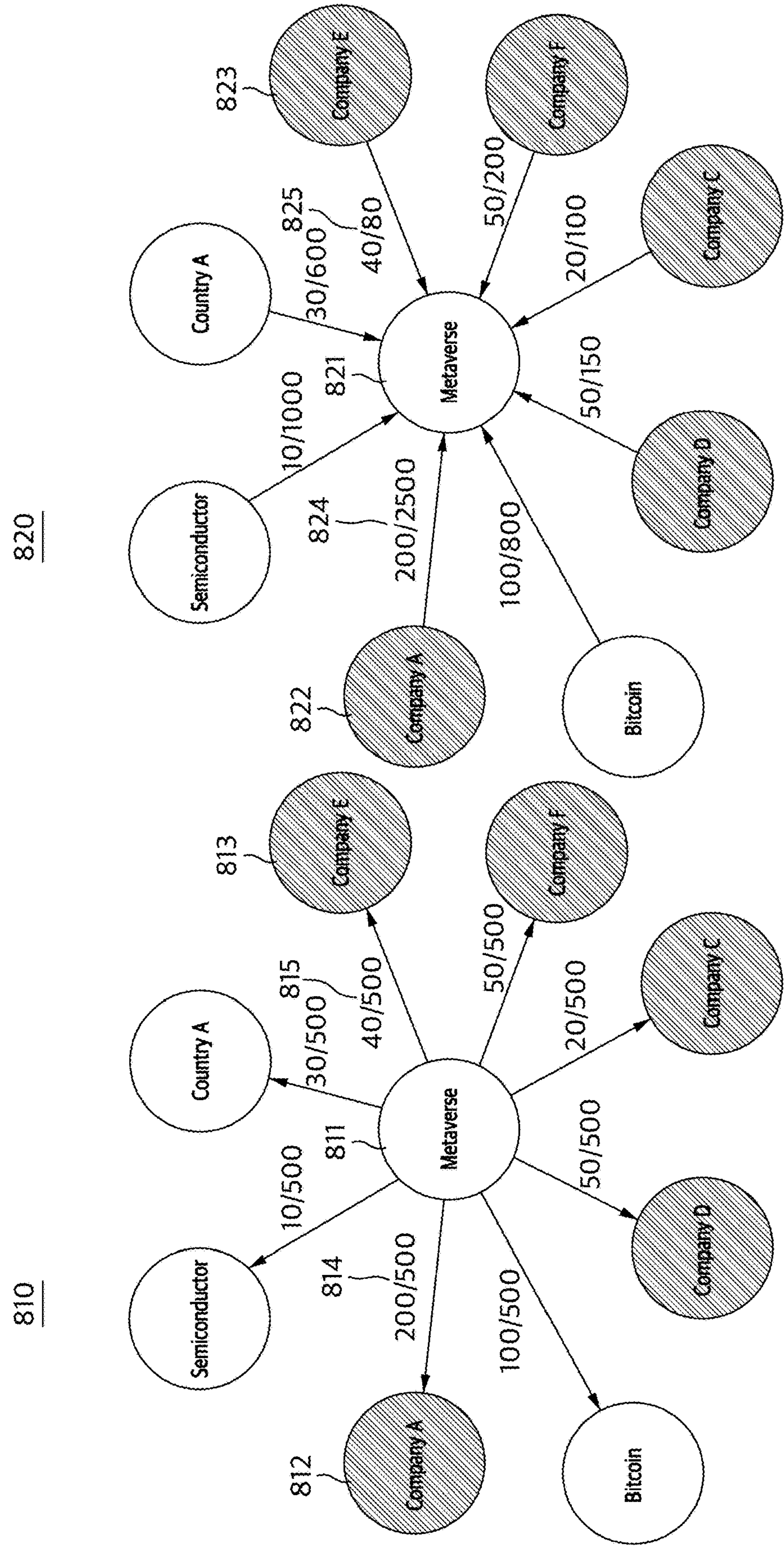
FIG. 8 illustrates diagrams for explaining a directed weighted co-occurrence graph generated based on a keyword set and total frequency.

FIG. 8 illustrates diagrams for explaining a directed weighted co-occurrence graph generated based on a keyword set and total frequency.

Referring to FIG. 7, the electronic device 100 may identify the total frequency that a keyword pair is included together in each of at least one text element based on the text set, and the co-occurrence graph may be determined based on the keyword set and the total frequency. A co-occurrence graph 700 may include a first node 701 corresponding to "Metaverse," a second node 702 corresponding to "Company A" and a third node 703 corresponding to "Company E," at least one node connected to each of the first node 701, the second node 702 and the third node 703, and weights of the edges corresponding to the connections. The node corresponding to "Metaverse" may be referred to as the first node 701, the node corresponding to "Company A" may be referred to as the second node 702 and the node corresponding to "Company E" may be referred to as the third node 703.

Referring to the co-occurrence graph 700, the first node 701 corresponding to "Metaverse" may be connected to a node corresponding to "Semiconductor," the node corresponding to "Company A," a node corresponding to "Company C," a node corresponding to "Company D," the node corresponding to "Company E," a node corresponding to "Company F," a node corresponding to "Country A" and a node corresponding to "Bitcoin." Further, the weight of the edge between the first node 701 and the second node 702 may be 200, which is the total frequency that "Metaverse" and "Company A" appear together in each of at least one text element. Further, the weight of the edge between the first node 701 and the third node 703 may be 40, which is the total frequency that "Metaverse" and "Company E" appear together in each of the at least one text element.

According to an example embodiment, the electronic device 100 may identify the total frequency (in other words, the total frequency of a specific keyword) that the specific keyword is included in at least one text element together with another keyword that form a keyword pair, and may determine the degree of association of the keyword pair further based on the total frequency of the specific keyword. For example, based on the importance of the total frequency of each of the keyword pair based on the total frequency of the specific keyword, the electronic device may determine the degree of association of each of the keyword pair.

For example, based on the co-occurrence graph 700, the electronic device 100 may identify the total frequency (in other words, the total frequency of "Metaverse") that "Metaverse" corresponding to the first node 701 is included in at least one text element together with other keywords (for example, "Company A," "Semiconductor," "Country A," "Company E" and so on) that from a keyword pair with "Metaverse." Further based on the total frequency of "Metaverse" (for example, based on the importance of frequency of each of the keyword pairs based on the total frequency of "Metaverse"), the electronic device 100 may also determine the degree of association of each keyword pair that includes "Metaverse."

When determining the degree of association of a keyword pair, if the total frequency of a specific keyword is more considered, the electronic device 100 may determine a response word more appropriately with a high degree of association with a query word. For example, if the difference in business scale between two companies is large, the difference in the absolute number of text data for the two companies can be large. In this case, by considering the relative importance of the specific keyword based on the absolute number of text data for each company, the electronic device 100 may determine more appropriately the relevance to the specific keyword for each company.

For example, Company A may be a large company that manufactures semiconductors and mobile phones. In other words, "Company A" may be an IT-related keyword such as "Semiconductor," "Cellphone," "AI Semiconductor" and "Metaverse," and keywords frequently included in economic news. The total frequency of "Company A" and "Semiconductor" being included in each of at least one text element may be 1300. The total frequency of "Company A" and "Cellphone" being included in each of the at least one text element may be 700. The total frequency of "Company A" and "AI Semiconductor" being included in each of the at least one text element may be 300. The total frequency that "Company A" and "Metaverse" are included in each of the at least one text element may be 200. In other words, the total frequency that "Company A" is included in each of the at least one text element with one of the keywords "Semiconductor," "AI Semiconductor," "Cellphone" and "Metaverse" may be 2500. Company A is a large company even if it does not engage in metaverse-related business, and thus the keyword "Company A" may appear in many economic news related to "Metaverse."

Conversely, Company E may be a company that conducts business related to the metaverse, but may be a relatively smaller company than Company A. Accordingly, the number of economic news including the keyword "Company E" may be much smaller than the number of economic news including the keyword "Company A." With regard thereto, the total frequency that "Company E" is included in each of at least one text element with one of the keywords "Country A," "Metaverse" and "Media" may be 80. The total frequency that "Metaverse" and "Company E" appear together in each of the at least one text element may be 40. In other words, although Company E is a company engaged in business related to the metaverse, the total frequency of appearing with the keyword "Metaverse" in at least one text element may be lower than that of Company A.

With regard thereto, in order to identify the relative degree of association focused on a specific keyword compared to another keyword, the electronic device 100 may determine a directed weighted co-occurrence graph.

A directed weighted co-occurrence graph 810 may include at least one first sub weight that is from a first node 811 to at least one node. Further, a directed weighted co-occurrence graph 820 may include at least one second sub weight that is from the at least one node to a first node 821. With regard to FIGS. 8 to 10, in the co-occurrence graph or the directed weighted co-occurrence graph, at least one node that is connected to a node corresponding to a query word may be referred to as a connection node. Further, in the co-occurrence graph or the directed weighted co-occurrence graph, one node that is connected to at least one connection node, that is the node corresponding to the query word may be referred to as a center node. Here, the first sub weight may be a sub weight in the direction from the center node to a connection node (outflow). The second sub weight may be a sub weight in the direction from a connection node to the center node (inflow).

According to an example embodiment, the first sub weight between a first node (for example, a center node) and a second node (for example, a connection node) may be identified based on the first total frequency that a keyword corresponding to the first node and a keyword corresponding to the second node are included together in each of the at least one text element and the second total frequency that the keyword corresponding to the first node is included in each of the at least one text element. Further, the second sub weight between the first node and the second node may be identified based on the first total frequency and the third total frequency that a keyword corresponding to the second node is included in each of the at least one text element. Specifically, the sub weight from an ith node (the i-th node) to a jth node (the j-th node) in a directed weighted co-occurrence graph may be calculated by Equation 1.

$$e'_{i\to j} = \frac{e_{ij}}{deg(i)} = \frac{e_{ij}}{\sum_{r=1}^{k} e_{ir}} \qquad \text{Equation 1}$$

$e_{ij}$ may be the total frequency that a keyword corresponding to the i-th node (hereinafter referred to as the i-th keyword) and a keyword corresponding to the j-th node (hereinafter referred to as the j-th keyword) are included in each of the at least one text element. deg(i) may be the total frequency that the i-th keyword is included in each of the at least one text element. In a directed weighted co-occurrence graph, there may be k number of nodes connected to the i-th node. In other words, when the i-th node is called the center node, for k number of connection nodes connected to the center node, deg(i) may be the total frequency that one of k number of keywords corresponding to the k number of connection nodes and the i-th keyword are included together in each of the at least one text element. In other words, $e'_{i\to j}$ indicates the relative degree of association that the i-th keyword is focused on the j-th keyword among the k number of keywords, and may be a value between 0 to 1.

In the directed weighted co-occurrence graph 810, nodes corresponding to "Metaverse," "Company A" and "Company E" may be the first node 811, a second node 812 and a third node 813, respectively. When a query word is "Metaverse," a center node is the first node 811, and keywords corresponding to connection nodes may be "Semiconductor," "Company A," "Company C," "Company D," "Company E," "Company F," "Country A" and "Bitcoin." With regard to the directed weighted co-occurrence graph 810, deg(i) which is the total frequency that "Metaverse" is included in each of the at least one text element may be identified as 500 that is the sum of the weights of the edges between one of the connection nodes and the first node 811.

Since the total frequency that "Metaverse" and "Company A" are included together in each of the at least one text element is 200, a first sub weight 814 from the first node 811 corresponding to "Metaverse" to the second node 812 corresponding to "Company A" may be identified as 200/500. Similarly, since the total frequency that "Metaverse" and "Company E" are included together in each of the at least one text element is 40, a first sub weight 815 from the first node 811 corresponding to "Metaverse" to the third node 813 corresponding to "Company E" may be identified as 40/500. As a similar process is performed, the directed weighted co-occurrence graph 810 of FIG. 8 may be determined.

Before the directed weighted co-occurrence graph 820 is determined, the total frequency by keyword for each connection node connected to the first node 821 corresponding to the query word "Metaverse" may be determined first. The total frequency related to "Company A" among the keywords for connection nodes may be determined based on the co-occurrence graph 700 of FIG. 7. For example, the total frequency related to "Company A" is the total frequency that "Company A" is included in each of the at least one text element together with one of "Semiconductor," "AI Semiconductor," "Cellphone" and "Metaverse," and may be 2500. Similarly, the total frequency related to "Company E" is the total frequency that "Company E" is included in each of the at least one text element together with one of "Country A," "Media" and "Metaverse," and may be 80.

Since the total frequency that "Metaverse" and "Company A" are included together in each of the at least one text element is 200, a second sub weight 824 from a second node 822 corresponding to "Company A" to the first node 821 corresponding to "Metaverse" may be identified as 200/2500. Since the total frequency that "Metaverse" and "Company E" are included together in each of the at least one text element is 40, a second sub weight 825 from a third node 823 corresponding to "Company E" to the first node 821 corresponding to "Metaverse" may be identified as 40/80. As a similar process is performed, the directed weighted co-occurrence graph 820 may be determined.

Figure 9:
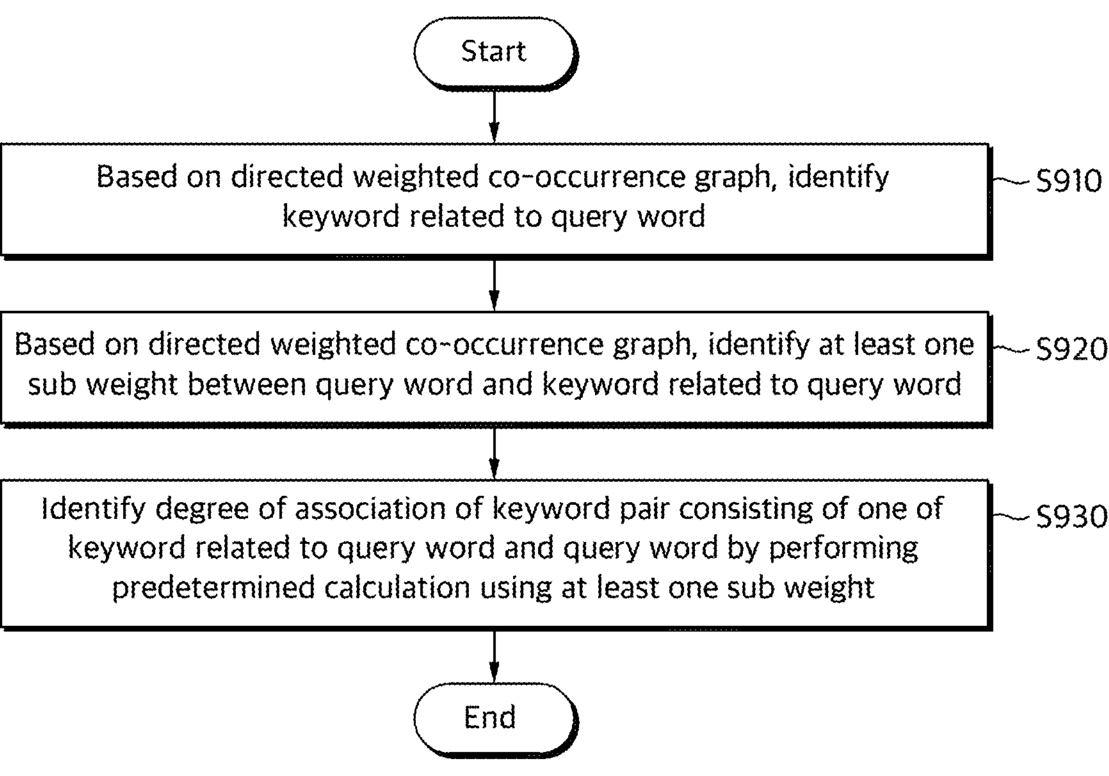
FIG. 9 is a flowchart showing a method of determining the degree of association of a keyword pair based on a directed weighted co-occurrence graph.

FIG. 9 is a flowchart showing a method of determining the degree of association of a keyword pair based on a directed weighted co-occurrence graph.

In operation S910, based on a directed weighted co-occurrence graph, an electronic device may identify keywords related to a query word.

For example, in the directed weighted co-occurrence graph, the electronic device may identify at least one of connection nodes connected to a center node corresponding to the query word, and identify keywords corresponding to connection nodes as keywords related to the query word. The keyword related to the query word may include at least one word.

According to an example embodiment, a keyword related to a query word may correspond to at least one node (in other words, a connection node) that is connected to a node (a center node) that corresponds to the query word in a co-occurrence graph or a directed weighted co-occurrence graph. In other words, one of keywords related to the query word and the query word may be included together in one of at least one text element. Referring to FIG. 8, when the query word is "Metaverse," keywords related to the query word may be "Semiconductor," "Company A," "Company C," "Company D," "Company E," "Company F," "Country A" and "Bitcoin."

In operation S920, based on the directed weighted co-occurrence graph, the electronic device may identify at least one sub weight between the query word and a keyword related to the query word.

When there are n number of keywords related to the query word, at least one sub weight between the query word and a keyword related to the query word may include n number of first sub weights in the direction from the center node to connection nodes (outflow) and n number of second sub weights in the direction from the connection nodes to the center node (inflow).

According to an example embodiment, based on a directed weighted co-occurrence graph, the electronic device 100 may identify at least one first sub weight between the query word and a keyword related to the query word. For example, based on the directed weighted co-occurrence graph 810, the electronic device 100 may identify at least one first sub weight from the first node 811 corresponding to "Metaverse" which is the query word to a connection node.

According to an example embodiment, based on a directed weighted co-occurrence graph, the electronic device 100 may identify at least one second sub weight between the query word and a keyword related to the query word. For example, based on the directed weighted co-occurrence graph 820, the electronic device 100 may identify at least one second sub weight from a connection node to the first node 821 corresponding to the query word "Metaverse."

In operation S930, the electronic device may identify the degree of association of a keyword pair consisting of one of keywords related to the query word and the query word by performing a predetermined calculation using the at least one sub weight.

According to an example embodiment, performing a predetermined calculation using at least one first sub weight and at least one second sub weight, the electronic device 100 may identify the degree of association of a keyword pair consisting of one of keywords related to the query word and the query word. In an example embodiment related to the predetermined calculation, degree of association $e_{ij}$ of a keyword pair consisting of an i-th keyword and a j-th keyword according to the predetermined calculation may be calculated by Equation 2.

$$E_{ij} = e'_{i\to j} \times e'_{j\to i} = \frac{e_{ij}}{deg(i)} \times \frac{e_{ij}}{deg(j)} = \frac{e_{ij}}{\sum_{r=1}^{p} e_{ir}} \times \frac{e_{ij}}{\sum_{r=1}^{q} e_{rj}} \quad \text{Equation 2}$$

$E_{ij}$ is a numerical value of the relevance of a keyword pair consisting of the i-th keyword and the j-th keyword, and may be a result value of multiplication based on $$e'_{i\to j} \text{ and } e'_{j\to i}.$$

In various example embodiments, the relevance of the keyword pair consisting of the i-th keyword and the j-th keyword may be the result value of a sum or another weighted operation, in addition to the multiplication based on $$e'_{i\to j} \text{ and } e'_{j\to i}.$$

deg(i) may be the total frequency related to the i-th keyword. In the directed weighted co-occurrence graph, there may be p number of connection nodes that are connected to the center node corresponding to the i-th keyword, and the number of keywords related to the i-th keyword which is the query word may be p. In other words, deg(i) may be the total frequency that one of p number of keywords and the i-th keyword are together included in each of the at least one text element. In other words, $$e'_{i\to j}$$

indicates a relative degree of association that the i-th keyword is focused on the j-th keyword compared to p number of keywords, and may be a value between 0 to 1. Further, deg(j) may be the total frequency related to the j-th keyword. In the directed weighted co-occurrence graph, there may be q number of connection nodes connected to the center node corresponding to the j-th keyword, and the number of keywords related to the j-th keyword, which is the query word, may be q. In other words, deg(j) may be the total frequency that one of q number of keywords and the j-th keyword are included together in each of the at least one text element. In other words, $$e'_{j\to i}$$

is a relative degree of association that the j-th keyword is focused on the i-th keyword compared to q number of keywords, and may be a value between 0 to 1. In other words, degree of association $E_{ij}$ of the i-th keyword and the j-th keyword may be a value that is calculated comprehensively based on a relative degree of association focused on the j-th keyword of the i-th keyword and a relative degree of association focused on the i-th keyword of the j-th keyword.

Figure 10:
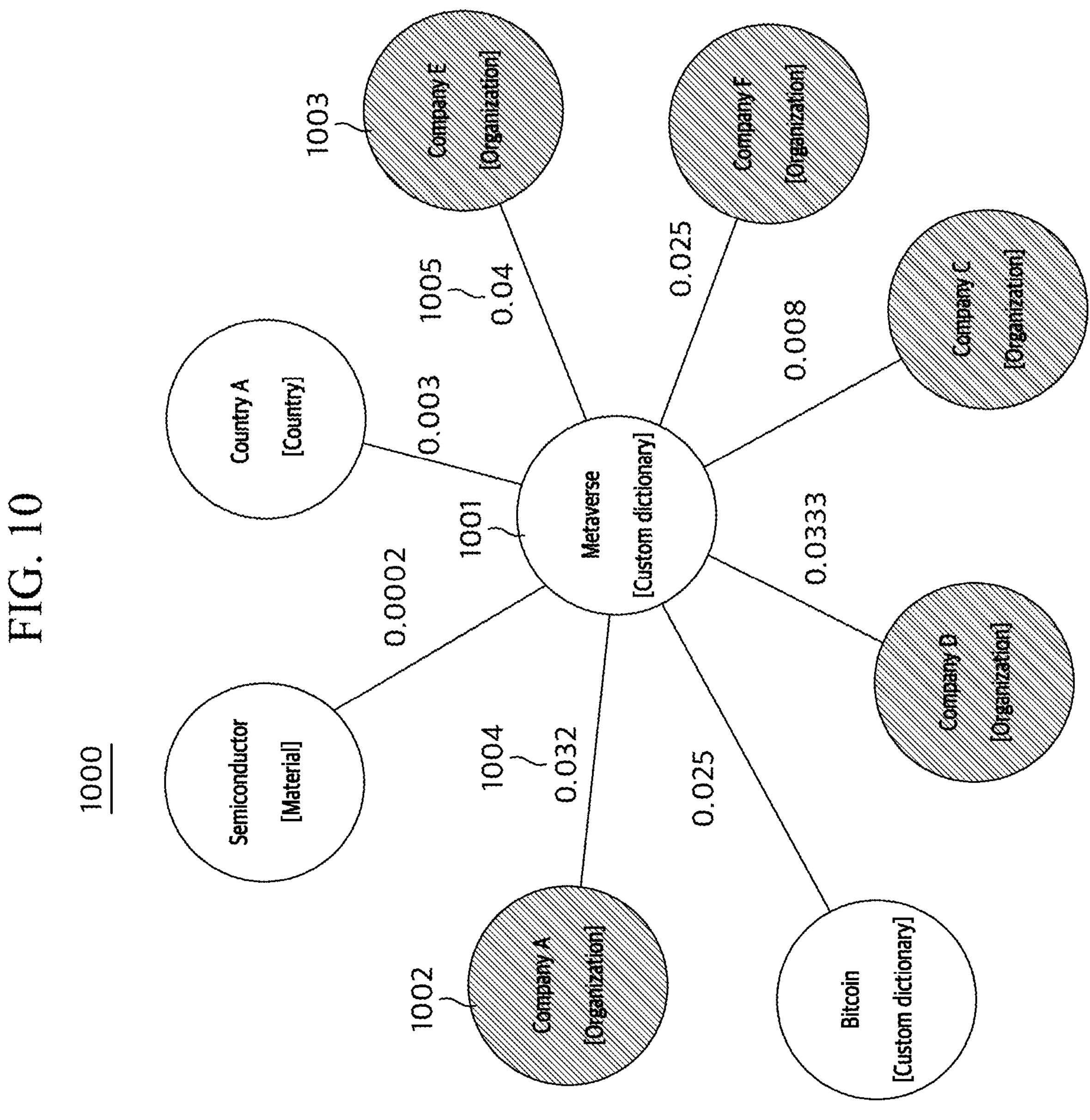
FIG. 10 is a diagram for explaining a directed weighted co-occurrence graph in which the degree of association of each keyword pair is indicated.

FIG. 10 is a diagram for explaining a directed weighted co-occurrence graph in which the degree of association of each keyword pair is indicated.

According to an example embodiment, the degrees of association of a keyword pair may be calculated through Equation 2. The electronic device 100 may determine a degree of association of a keyword pair through a predetermined calculation using the first sub weight of the directed weighted co-occurrence graph 810 illustrated in FIG. 8 and a second sub weight of the directed weighted co-occurrence graph 820 illustrated in FIG. 8. Here, a keyword pair may consist of "Metaverse" and a keyword related to "Metaverse."

The degree of association of "Metaverse" and "Semiconductor" is $$\frac{10}{500} \times \frac{10}{1000},$$

and may be 0.0002. The degree of association between "Metaverse" and "Company A" is $$\frac{200}{500} \times \frac{200}{2500},$$

and may be 0.032. More specifically, a weight 1004 of an edge between a node 1001 corresponding to "Metaverse" and a node 1002 corresponding to "Company A" may be 0.032. The degree of association between "Metaverse" and "Bitcoin" is $$\frac{100}{500} \times \frac{100}{800},$$

and may be 0.025. The degree of association between "Metaverse" and "Company D" is $$\frac{50}{500} \times \frac{50}{150},$$

and may be 0.0333. The degree of association between "Metaverse" and "Company C" is $$\frac{20}{500} \times \frac{20}{100},$$

and may be 0.008. The degree of association between "Metaverse" and "Company F" is $$\frac{20}{500} \times \frac{50}{200},$$

and may be 0.025. The degree of association between "Metaverse" and "Company E" is $$\frac{40}{500} \times \frac{40}{80},$$

and may be 0.04. More specifically, a weight 1005 of an edge between the node 1001 corresponding to "Metaverse" and a node 1003 corresponding to "Company E" may be 0.04. The degree of association between "Metaverse" and "County A" is $$\frac{30}{500} \times \frac{30}{600},$$

and may be 0.003.

The size order of the degrees of association between "Metaverse" and keywords related to "Metaverse" identified based on the directed weighted co-occurrence graph may be an order of "Company E," "Company D," "Company A," "Bitcoin," "Company F," "Company C," "Country A" and "Semiconductor." In other words, the total frequency that "Company E" and "Metaverse" are included together in each of the at least one text element is 40, and even if 40 is less than 200, which is the total frequency associated with "Company A" and "Metaverse," the degree of association between "Company E" and "Metaverse" may be calculated as greater than the degree of association between "Company A" and "Metaverse." Therefore, based on the directed weighted co-occurrence graph, by determining the degrees of association of keyword pairs, the electronic device 100 may determine a keyword with a substantially high degree of association with the query word as a response word.

Based on the degrees of association of keyword pairs, the electronic device 100 may filter a keyword that satisfies specific conditions among keywords related to the query word.

According to an example embodiment, based on the degrees of association of keyword pairs, the electronic device 100 may perform a pruning method on keywords related to the query word. Accordingly, among the keywords related to the query word, some keywords that have a relatively low degree of association with the query word may be filtered. For example, the electronic device 100 may identify some keywords with a relatively low degree of association among keywords related to the query word according to set rules.

For example, one of the set rules may be to filter out keywords in the bottom N % with a low degree of association. When N=20, among keywords "Semiconductor," "Company A," "Company C," "Company D," "Company E," "Company F," "Country A" and "Bitcoin" related to "Metaverse," the bottom 20% keywords with a low degree of association may include "Semiconductor." Accordingly, the electronic device 100 may determine "Company A," "Company C," "Company D," "Company E," "Company F," "Country A" and "Bitcoin" as response words from which "Semiconductor" with the low degree of association among the keywords related to "Metaverse" is filtered. However, the set rules are not limited to filtering out keywords in the bottom N % with a low degree of association. For example, one of the set rules may be to filter N number of keywords with a low degree of association where the N number is a set number. Further, one of the set rules may be to filter keywords of which degree of association is less than or equal to a set value. For example, if a set value is 0.001 in FIG. 10, filtered may be "Semiconductor" which is a keyword with a degree of association of 0.0002 which is lower than 0.001 among the at least one keyword related to "Metaverse."

According to an example embodiment, the electronic device 100 may identify a category for each of keywords included in a keyword set. More specifically, for each keyword within the at least one text element, the electronic device 100 may identify at least one of a plurality of preset categories as a keyword category. Here, the plurality of preset categories may include at least one of "Person," "Location," "Organization," "Artifact," "Date," "Time," "Country," "Animal," "Plant," "Quantity," "Study-field," "Theory," "Event," "Material," "Term" and "Custom dictionary." The types of categories above are mere examples, and the categories are not limited thereto. For example, some of the listed categories may be omitted, or additional categories not listed may be added. Referring to FIG. 10, a category of "Metaverse" may be identified as "Custom dictionary," a category of "Semiconductor" as "Material," a category of "Company A" as "Organization," a category of "Company C" as "Organization," a category of "Company D" as "Organization," a category of "Company E" as "Organization," a category of "Company F" as "Organization," a category of "Country A" as "Country" and a category of "Bitcoin" as "Custom dictionary."

Figure 11:
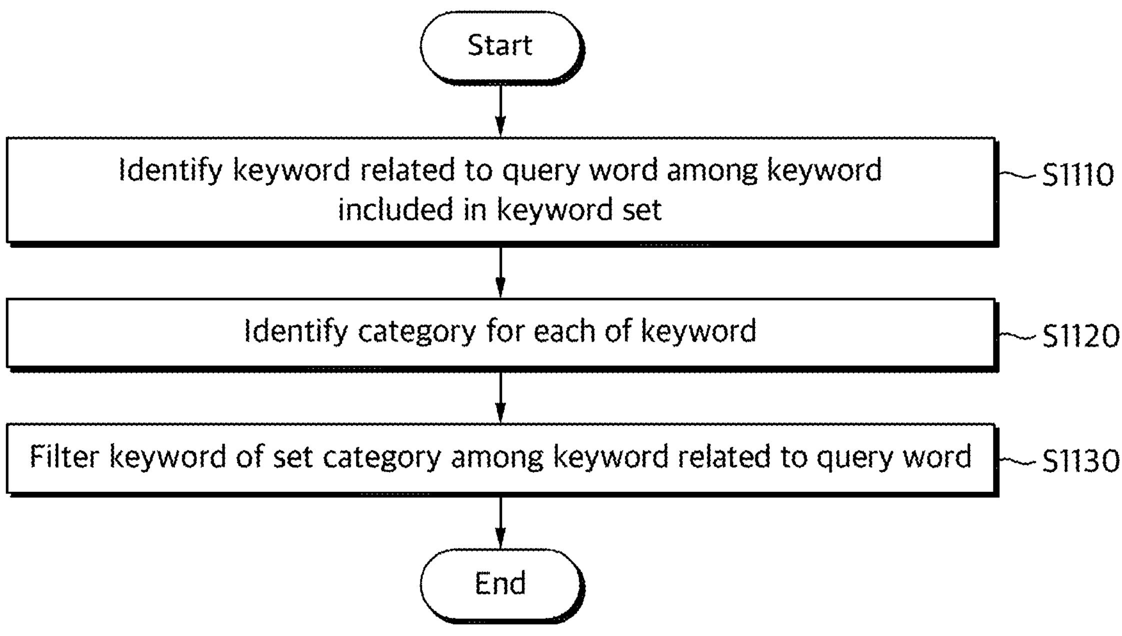
FIG. 11 is a flowchart showing a method of filtering keywords of a set category among keywords related to a query word.

FIG. 11 is a flowchart showing a method of filtering keywords of a set category among keywords related to a query word.

In operation S1110, an electronic device may identify keywords related to a query word among keywords included in a keyword set.

According to an example embodiment, based on a co-occurrence graph or a directed weighted co-occurrence graph, the electronic device 100 may identify at least one node (in other words, a connection node) connected to a node (in other words, a center node) corresponding to the query word. The electronic device 100 may identify a keyword corresponding to the identified connection node as a keyword related to the query word. Referring to FIG. 8, when a query word is "Metaverse," keywords related to "Metaverse" may include "Semiconductor," "Company A," "Company C," "Company D," "Company E," "Company F," "Country A" and "Bitcoin."

In operation S1120, the electronic device may identify a category for each of the keywords.

For example, referring to FIG. 10, the category of "Metaverse" may be identified as "Custom dictionary," the category of "Semiconductor" as "Material," the category of "Company A" as "Organization," the category of "Company C" as "Organization," the category of "Company D" as "Organization," the category of "Company E" as "Organization," the category of "Company F" as "Organization," the category of "Country A" as "Country" and the category of "Bitcoin" as "Custom dictionary."

In operation S1130, the electronic device may filter a keyword of a set category among the keywords related to the query word.

Among the plurality of categories, some categories are much unrelated to finance, and thus it is more appropriate that some categories to be filtered. Here, the set categories may be categories that are set to be filtered due to lack of correlation with finance among the plurality of categories. For example, a set category may include at least one of a date-related category, a time-related category and a country-related category. With regard thereto, referring to FIG. 10, the electronic device 100 may filter "Country A," which is a keyword in the set category among keywords related to the query word. In other words, after keywords in the set category called "Country A" are filtered, keywords related to the query word may include "Company E," Company D," "Company A," "Bitcoin," "Company F," "Company C" and "Semiconductor."

According to another example embodiment, by filtering keywords in the set category among the remaining keywords after performing the pruning method on keywords related to the query word, the electronic device 100 may identify response words. Referring to FIG. 10, after performing the pruning method on keywords related to the query word, the remaining keywords may include "Company A," "Company C," "Company D," "Company E," "Company F," "Country A" and "Bitcoin." Further, the response words according to filtering the keyword of the set category, as the keyword "Country A" is filtered, may include "Company A," "Company C," "Company D," "Company E," "Company F" and "Bitcoin."

Figure 12:
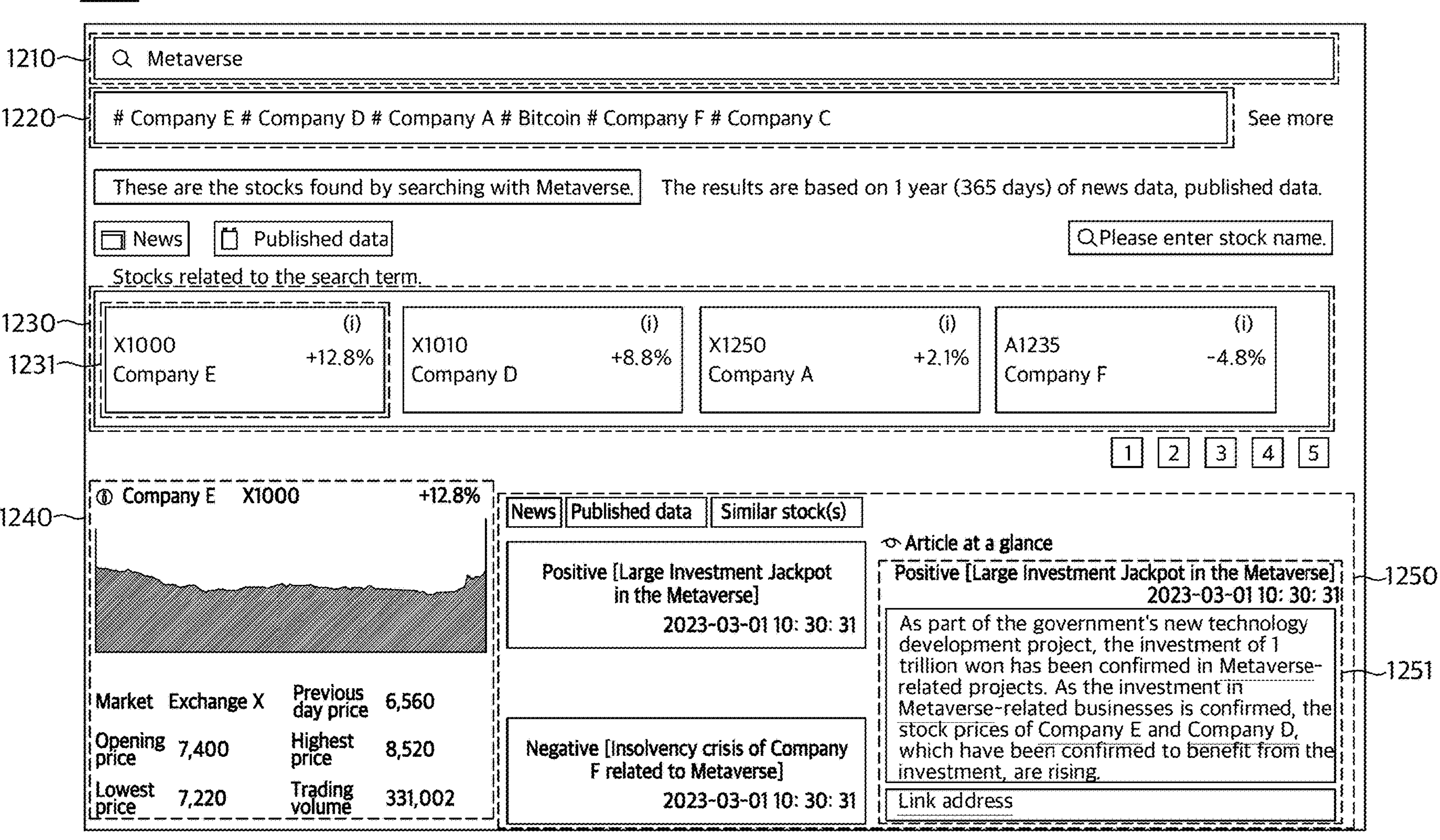
FIG. 12 is a diagram according to an example embodiment in which information on response words is displayed on a terminal.

FIG. 12 is a diagram according to an example embodiment in which information on response words is displayed on a terminal.

FIG. 12 illustrates a screen 1200 on the terminal 110 displaying information on response words corresponding to a query word. The screen 1200 may include a query area 1210, a first area 1220, a second area 1230, a third area 1240 and a fourth area 1250. FIG. 12 illustrates the screen 1200 displaying information on response words provided by the electronic device 100 in response to "Metaverse" being input in the query area 1210.

The query area 1210 displaying the query word that is input through the terminal 110 may be an area of the screen 1200. Referring to FIG. 12, query of the user through the terminal 110 may be in the form of a word "Metaverse." However, the query input through the terminal 110 is not limited to a word form, and may be a sentence. Here, the electronic device 100 may analyze the context of the query in a sentence and identify a query word by which the query to be made. For example, if the query is "Show me stocks related to Metaverse," the electronic device 100 may analyze the context of the query and identify "Metaverse" by which the query was made. Further, FIG. 12 illustrates that the query input through the terminal 110 is a general keyword and a single keyword, but the query is not limited thereto. For example, the query input through the terminal 110 may be a target keyword corresponding to a stock name listed on an exchange, and a query input through the terminal 110 may include a plurality of query words. For example, the query input through the terminal 110 may be "Company E" and "Company D." Below, described will be an example embodiment in which the electronic device 100 displays information on response words on the screen 1200 when the query word is "Metaverse."

The first area 1220 may be a partial area of the screen 1200 where keywords related to the query word "Metaverse" are displayed as response words. In an example embodiment, displayed in the first area 1220 may be response words from which a keyword with a low degree of association with the query word or a keyword in a set category is filtered from the keywords related to the query word "Metaverse." For example, from the keywords "Company E," "Company D," "Company A," "Bitcoin," "Company F," "Company C," "Country A" and "Semiconductor" related to "Metaverse," the electronic device 100 may filter 1) "Semiconductor" which is a keyword identified as having a relatively low degree of association with "Metaverse" and 2) "Country A" which is a keyword of a set category, through the pruning method. In other words, by filtering "Semiconductor" and "Country A," the electronic device 100 may identify "Company A," "Company C," "Company D," "Company E," "Company F," and "Bitcoin" as response words.

A sort order among the response words displayed on the first area 1220 according to an example embodiment may be a size order of degrees of association between the query word and the response words.

The degrees of association between the query word and the response words may be determined through a predetermined calculation using a first sub weight and a second sub weight between two nodes corresponding to a keyword pair consisting of the query word and a response word in the directed weighted co-occurrence graph. Referring to FIG. 12, the sort order of the response words may be determined as "Company E," "Company D," "Company A," "Bitcoin," "Company F" and "Company C" based on the degrees of association between the query word and the response words.

Degrees of association between a query word and response words in another example embodiment may be determined by the total frequency that the query word is included in at least one text element together with the response words. Referring to FIG. 7, 1) the total frequency that "Metaverse" and "Company A" are included together in each of the at least one text element is 200, 2) the total frequency that "Metaverse" and "Bitcoin" are included in each of the at least one text element is 100, 3) the total frequency that "Metaverse" and "Company D" are included in each of the at least one text element is 50, 4) the total frequency that "Metaverse" and "Company C" are included in each of the at least one text element is 20, 5) the total frequency that "Metaverse" and "Company F" are included in each of the at least one text element is 50, and 6) the total frequency that "Metaverse" and "Company E" are included in each of the at least one text element is 40. In other words, the sort order of the response words may be "Company A," "Bitcoin," "Company D," "Company F," "Company E" and "Company C."

The response words may be classified into a first response word which is a target keyword and a second response word which is a general keyword. The first response word, which is the target keyword, may be a keyword corresponding to a stock listed on an exchange among the response words, for example, "Company E," "Company D," "Company A," "Company F" and "Company C." Further, the second response word, which is a general keyword, may be, for example, "Bitcoin." FIG. 12 illustrates that the first response words, which are the target keywords, and the second response word, which is a general keyword, are displayed together in the first area 1220, but the present disclosure is not limited thereto. For example, the electronic device 100 may generate information on the first response words and information on the second response word separately. With regard thereto, the first response words and the second response word may be displayed separately in sub areas within the first area 1220.

The second area 1230 may be a partial area of the screen 1200 where information on the first response word, which is a target keyword among the response words, is displayed.

According to an example embodiment, the electronic device 100 may generate the first response word which is a target keyword and the second response word which is a general keyword separately, and generate information on the first response word and information on the second response word separately. The information on the first response word may be displayed on the second area 1230. The sort order of information on the first response words displayed on the second area 1230 may be determined similarly to the sort order of the response words. In other words, the sort order of the first response words displayed on the second area 1230 may be "Company E," "Company D," "Company A," "Company F" and "Company C."

The second area 1230 may include one or more sub areas (for example, sub areas 1231). Each sub area may provide information on each keyword included in the first response words. The sub area 1231 may display information on a response word with a highest degree of association with the query word among the first response words. For example, the sub area 1231 may display information on "Company E" with the highest degree of association with "Metaverse" which is the query word. The sub area 1231 may display "Company E," "X1000" which is a ticker symbol of "Company E," return over a set period of time (for example, 1 day) of "Company E" and an icon as the entry point for the detailed information page for "Company E." Detailed information related to "Company E" such as financial statements of "Company E" may be included in the detailed information page of "Company E." The information on the first response word is not limited to the information displayed on the second area 1230, and information according to various example embodiments may be included.

Even though not illustrated in FIG. 12, the electronic device 100 may provide information on a second response word. With regard thereto, in response to a user input related to "Bitcoin" which is a second response word on the first area 1220, the electronic device 100 may provide information on "Bitcoin" by displaying it in an area within the screen 1200.

The third area 1240 may be a partial area of the screen 1200 where detailed information of the response word selected in the second area 1230 is displayed. The response word selected in the second area 1230 may be identified based on a user input through the second area 1230. For example, in response to a user input related to "Company E" through the second area 1230, as illustrated in FIG. 12, the third area 1240 may display detailed information of "Company E." For another example, in response to a user input related to "Company D" through the second area 1230, the third area 1240 may display detailed information on "Company D" in a way different from what is illustrated in FIG. 12. A response word selected through the second area 1230 may be initially set to be a response word with the highest degree of association with the query word, but is not limited thereto.

Referring to FIG. 12, the third area 1240 may display information on price chart of "Company E," previous day price, opening price, highest price, lowest price and trading volume of "Company E" which are the detailed information of "Company E." The detailed information on the first response word displayed in the third area 1240 is not limited to the information displayed in the third area 1240, and information according to various example embodiments may be included.

The fourth area 1250 may be a partial area of the screen 1200 displaying at least one of information on a first text element in which the query word and a response word are included together among the at least one text element and information on first text data including the first text element. In addition thereto, information on a link address of the first text data may also be displayed in the fourth area 1250.

In the text data, text data including many response words with a high degree of association with the query word may be exposed at the top of the fourth area 1250. For example, the title of first text data 1251 may be "Large Investment Jackpot in the Metaverse." The first text element in the first text data 1251 may be "As the investment in Metaverse-related businesses is confirmed, the stock prices of Company E and Company D, which have been confirmed to benefit from the investment, are rising." In other words, in the first text element "As the investment in Metaverse-related businesses is confirmed, the stock prices of Company E and Company D, which have been confirmed to benefit from the investment, are rising," the query word "Metaverse," and "Company E" and "Company D" which are response words with a high degree of association with "Metaverse" may be included together. In other words, the first text data 1251 may be determined as data exposed at the top of the fourth area 1250. Further, the query word "Metaverse" which is the query word and "Company E" and "Company D" which are response words in the first text element may be displayed in the fourth area 1250 with emphasis.

According to an example embodiment, the electronic device 100 may identify a first type response word included in a first group and a second type response word included in a second group among the response words, and generate information on the first type response word and information on the second type response word separately. Here, the first group may be a group of preset good news-related keywords, and the second group may be a group of preset bad news-related keywords. Whether a keyword is good news or bad news may be set based on stock price changes during a set period of time (for example, an hour) after text data including the keyword is released. For example, if the stock price increases by the first rate or greater than the first rate (for example, 5% or more than 5%) during the set period after text data including a keyword is released, the keyword may be classified into the first group. Further, if the stock price falls by or below the second rate (for example, −5% or less) during the set period of time after text data including a keyword is released, the keyword may be classified into the second group. If the stock price fluctuates above the second rate and below the first rate (for example, above-5% and below 5%) during the set period after text data including a keyword is released, the keyword may be classified neither into the first group nor into the second group. Here, the keyword may correspond to neither a good news keyword nor a bad news keyword.

The first group may include finance-related keywords such as "quantitative easing" and "acquired." Immediately after news with the keyword "acquisition" is announced, the stock price of the acquired company may generally show an upward pattern. Further, immediately after news with "quantitative easing" as a keyword is announced, a company's stock price may generally show an upward pattern. In other words, among the response words corresponding to a query word, "acquired" and "quantitative easing" may be identified as the first type response words included in the first group. The second group may include finance-related keywords such as "credit crunch" and "acquisition." Immediately after news with the keyword "acquisition" is announced, the stock price of the acquiring company may generally show a falling pattern. Further, immediately after news with the keyword "credit crunch" is announced, a company's stock price may generally show a falling pattern. In other words, among the response words corresponding to the query word, "acquisition" and "credit crunch" may be identified as second type response words included in the second group.

Referring to FIG. 12, the first text data 1251 is text data including many first type response words such as "new technology development project." The first text data 1251 may be identified as text data that is good news in the financial market. On the contrary, the second text data is text data of which title is the insolvency crisis of "Company F" related to "Metaverse," and the second text data may be identified as text data that is bad news in the financial market.

Figure 13:
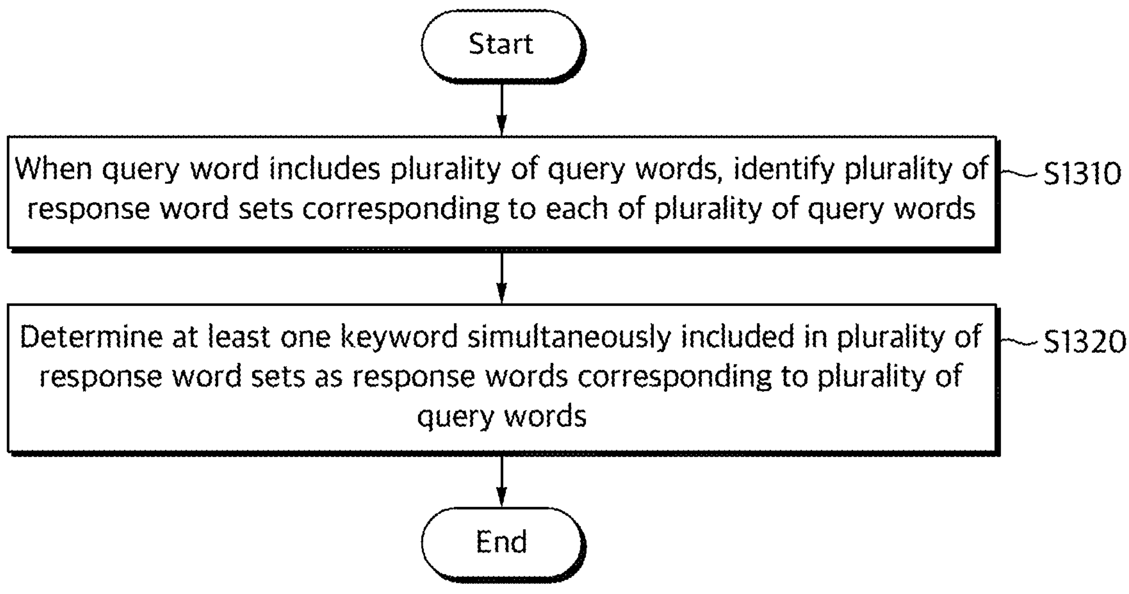
FIG. 13 is a flowchart showing a method for generating keyword information when there is a plurality of query words.

FIG. 13 is a flowchart showing a method for generating keyword information when there are a plurality of query words, and FIG. 14 is a diagram for explaining a method of generating keyword information when there are a plurality of query words.

In operation S1310, when a query word includes a plurality of query words, the electronic device may identify a plurality of response word sets corresponding to each of the plurality of query words.

In operation S1320, the electronic device may determine at least one keyword simultaneously included in the plurality of response word sets as response words corresponding to the plurality of query words.

The operations of determining a response word corresponding to a query word according to the example embodiments of FIGS. 1 to 12 may be performed in parallel for each of the plurality of query words. For example, the electronic device 100 may receive information on a plurality of query words from the user of the terminal 110. Accordingly, the electronic device 100 can identify a plurality of response word sets corresponding to the plurality of query words.

In an example embodiment, keywords simultaneously included in a plurality of response word sets may be determined as response words corresponding to a plurality of query words. In other words, the response words corresponding to the plurality of query words may be determined as words included in the intersection area of the plurality of response word sets. Further, a sort order of the response words corresponding to the plurality of query words may be determined based on sort rankings of the response words in each of the plurality of response word sets.

Referring to a table 1410 according to an example embodiment, "First word" and "Second word" may be query words classified as general keywords. When a query word is "First word," response word set A may include "Company A," "Company B," "Company C," "Company D," "Company E," "Company F," "Company G," "Company H" and "Company I" which are first response words among response words corresponding to "First word." When a query word is "Second word," response word set B may include "Company A," "Company G," "Company I," "Company B," "Company J," "Company K," "Company L" and "Company M" which are first response words corresponding to "Second word." Among the response words corresponding to the plurality of query words "First word" and "Second word," the first response words may include "Company A," "Company B," "Company G" and "Company I" which are the intersection of response word set A and response word set B.

A sort order of response words when there is a plurality of query words may be determined according to a value that is calculated based on sort rankings of response words in each response word set for each of the query words. In an example embodiment, the sort order of "Company A," "Company B," "Company G" and "Company I" may be determined based on a value corresponding to each keyword. The value corresponding to each keyword may be determined based on a sort ranking in each of the plurality of response word sets. Referring to the table 1410, the sort order of the first response words included in response word set A may be "Company A," "Company B," "Company C," "Company D," "Company E," "Company F," "Company G," "Company H" and "Company I." The sort order of the first response words included in response word set B may be "Company A," "Company G," "Company I," "Company B," "Company J," "Company K," "Company L" and "Company M." In other words, the sort order of "Company A," "Company B," "Company G" and "Company I" may be determined according to a value that is calculated based on the sort rankings of "Company A," "Company B," "Company G" and "Company I" in each of response word set A and response word set B.

For example, the value corresponding to "Company A" may be determined as $$\frac{1/9 + 1/8}{2} = \frac{17}{144},$$

based on 1) 1/9 which is the value corresponding to the first sort ranking of "Company A" in response word set A, which includes 9 first response words, and 2) 1/8 which is the value corresponding to the first sort ranking of "Company A" in response word set B, which includes 8 first response words.

For another example, the value corresponding to "company B" may be determined as $$\frac{2/9 + 4/8}{2} = \frac{52}{144},$$

based on 1) 2/9 which is the value corresponding to the second sort ranking of "Company B" in response word set A, which includes 9 first response words, and 2) 4/8 which is the value corresponding to the fourth sort ranking of "Company B" in response word set B, which includes 8 first response words.

For another example, the value corresponding to "Company G" may be determined as $$\frac{7/9 + 2/8}{2} = \frac{74}{144},$$

based on 1) 7/9 which is the value corresponding to the seventh sort ranking of "Company G" in response word set A, which includes 9 first response words, and 2) 2/8 which is the value corresponding to the second sort ranking of "Company G" in response word set B, which includes 8 first response words.

For another example, the value corresponding to "Company I" may be determined as $$\frac{9/9+3/8}{2}=\frac{99}{144},$$

based on 1) 9/9 which is the value corresponding to the ninth sort ranking of "Company I" in response word set A, which includes 9 first response words, and 2) 3/8 which is the value corresponding to the third sort ranking of "Company I" in response word set B, which includes 8 first response words.

In other words, the sort order of "Company A," "Company B," "Company G" and "Company I" which are the first response words corresponding to the plurality of query words may be the reverse order of the size of the value corresponding to each of the response words. In other words, when the query word includes multiple query words "First word" and "Second word," the sort order of the first response words may be "Company A," "Company B," "Company G" and "Company I." Similarly, referring to the table 1410, the second response words may include "Keyword A," "Keyword C," "Keyword F" and "Keyword I," among response words corresponding to "First word" and "Second word" which are the plurality of query words. Further, the sort order of "Keyword A," "Keyword C," "Keyword F" and "Keyword I" may also be determined according to a similar method. With regard thereto, when the electronic device 100 classifies and provides information on the first response words and information on the second response words, the sort order in the information on the first response words may be "Company A," "Company B," "Company G" and "Company I," and the sort order in the information on the second response words may be "Keyword A," "Keyword C," "Keyword F" and "Keyword I." However, referring to FIG. 12, the information on the response words may be provided together without the electronic device 100 classifying the information on the first response words and the information on the second response words. Here, the information on the response words may be determined based on sort rankings of the response words in each of the plurality of response word sets similarly to the sort order in the information on the first response words and the sort order in the information on the second response words of FIG. 14.

The query word is not limited to "First word" or "Second word" which is classified as a general keyword. For example, the query word may include a plurality of query words consisting of at least one word classified as a general keyword and at least one word classified as a target keyword. For another example, a query word may include a plurality of query words that are classified into target keywords. Here, the electronic device 100 may identify a plurality of response word sets corresponding to each of the plurality of target keywords, and may determine at least one keyword simultaneously included in the plurality of response word sets as a response word corresponding to the plurality of query words. For example, referring to a table 1420, a plurality of words "First company" and "Second company" may be query words classified as target keywords. Among response words corresponding to "First company" and "Second company," first response words may include "Company A," "Company B," "Company G" and "Company I." Further, referring to the table 1420, among response words corresponding to "First company" and "Second company" which are the plurality of query words, second response words may include "Keyword A," "Keyword C," "Keyword F" and "Keyword I." The sort order of "Company A," "Company B," "Company G" and "Company I" and the sort order of "Keyword A," "Keyword C," "Keyword F" and "Keyword I" may also be determined according to a similar method.

Figure 15:
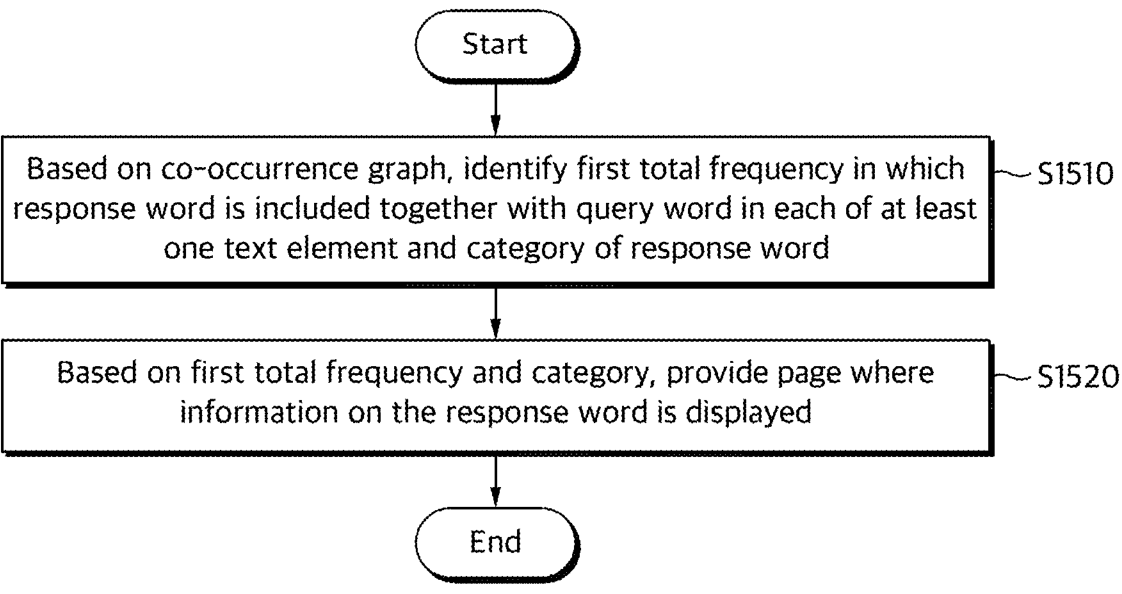
FIG. 15 is a flowchart showing a method of providing a page displaying information on response words based on first total frequency in which a response word is included along with the query word in each of at least one text element and a category of the response words.
Figure 16:
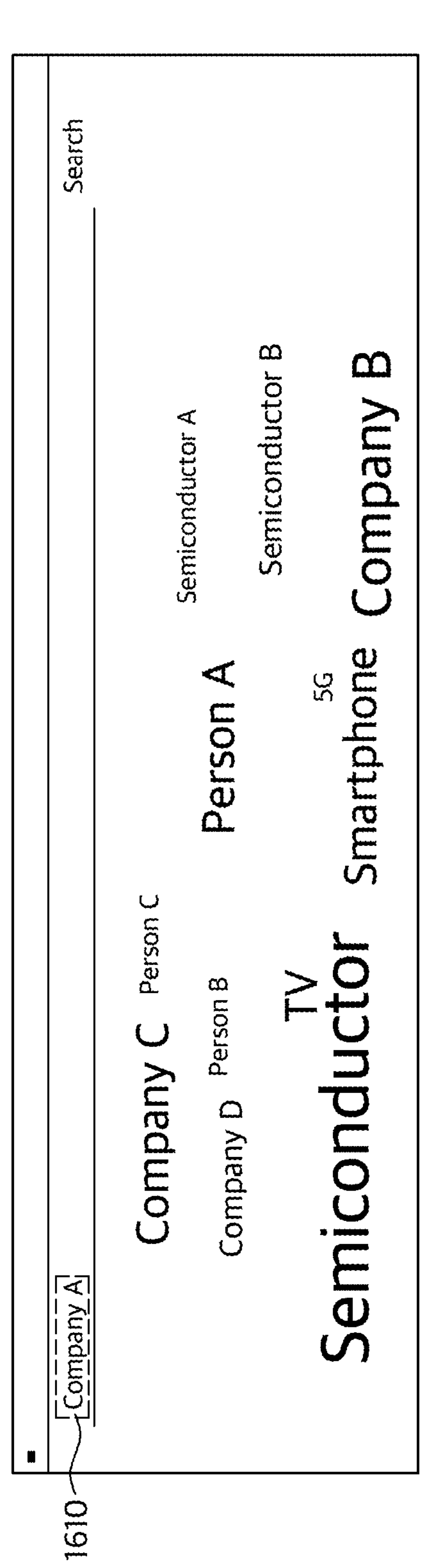
FIG. 16 is a diagram for explaining a method of providing a page on which information on the response words according to FIG. 15 is displayed.

FIG. 15 is a flowchart showing a method of providing a page displaying information on response words based on first total frequency in which a response word is included along with the query word in each of at least one text element and a category of the response words, and FIG. 16 is a diagram for explaining a method of providing a page on which information on the response words according to FIG. 15 is displayed.

In operation S1510, based on a co-occurrence graph, an electronic device may identify the first total frequency in which a response word is included together with a query word in each of at least one text element, and a category of the response word.

In operation S1520, based on first total frequency and category, the electronic device may provide page where information on the response word is displayed.

Referring to a page 1600 illustrated in FIG. 16, a query word entered in a query area 1610 may be "Company A." The electronic device 100 may identify the first total frequency that the response word is included together with "Company A" which is a query word in each of the at least one text element, and a category of the response word. Based on the first total frequency and the category, the electronic device 100 may display information on the response word differently for each response word on the page. For example, displaying the information on the response word differently for each response word on the page may be that the electronic device 100 displays information on the response word differently on the page in order for each response word to correspond to font and color according to a first total frequency and a category.

Referring to the page 1600, response words corresponding to "Company A" which is a query word may include "Person A," "Person B," "Person C," "Company B," "Company C," "Company D," "Semiconductor," "TV," "Smartphone," "5G," "Semiconductor A" and "Semiconductor B." More specifically, response words corresponding to "Company A" which is a query word may include 1) "Person A," "Person B" and "Person C" of category "Person," 2) "Company B," "Company C" and "Company D" of category "Organization" and 3) "Semiconductor," "TV," "Smartphone," "5G," "Semiconductor A" and "Semiconductor B" of category "Others."

According to an example embodiment, the electronic device 100 may determine a font differently for each response word based on the first total frequency. Further, based on a category of a response word, the electronic device 100 may determine a color differently for each response word. For example, "Semiconductor" may be a keyword with the greatest total frequency included with "Company A" in each of at least one text element. In other words, the font for "Semiconductor" may be determined to be the largest among the fonts for response words corresponding to "Company A." Conversely, "Semiconductor" or "5G" may be a keyword with a low total frequency included with "Company A" in each of the at least one text element. In other words, the font for "Semiconductor B" or "5G" may be determined to be relatively small. Further, keywords of category "Person," such as "Person A," "Person B" and "Person C," may be displayed in red on the page 1600, and keywords of category "Organization," such as "Company B," "Company C" and "Company D," may be displayed in blue on the page 1600, and keywords in category "Others," such as "Semiconductor," "TV," "Smartphone," "5G," "Semiconductor A" and "Semiconductor B" may be displayed in black on the page 1600. In other words, the user may easily check information on the response words corresponding to the query word through the page 1600.

Figure 17:
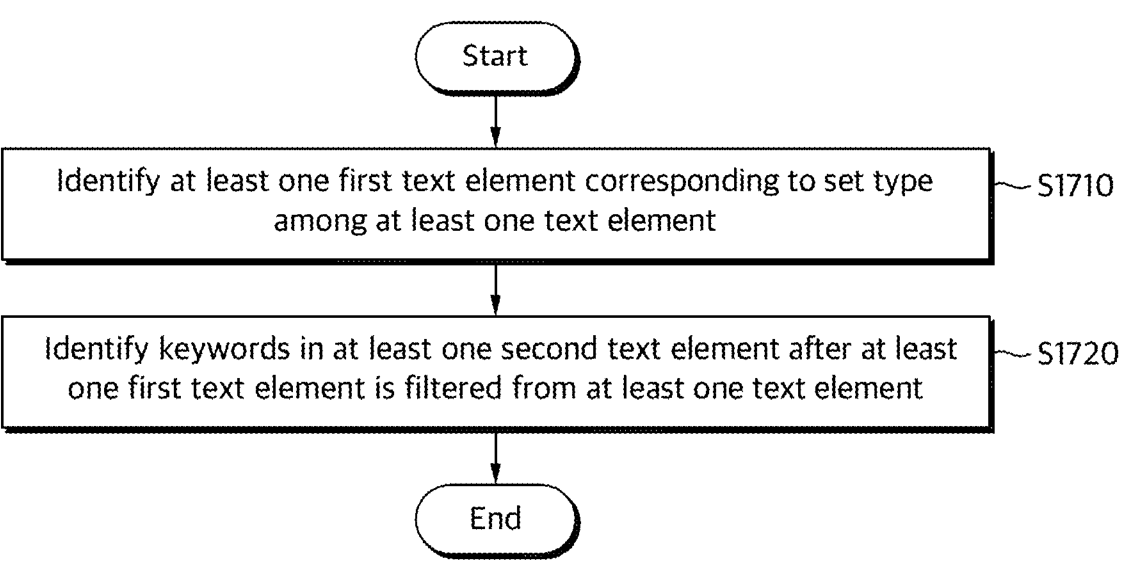
FIGS. 17 and 18 are flowcharts showing various preprocessing methods of text data related to filtering text elements corresponding to a set type.
Figure 18:
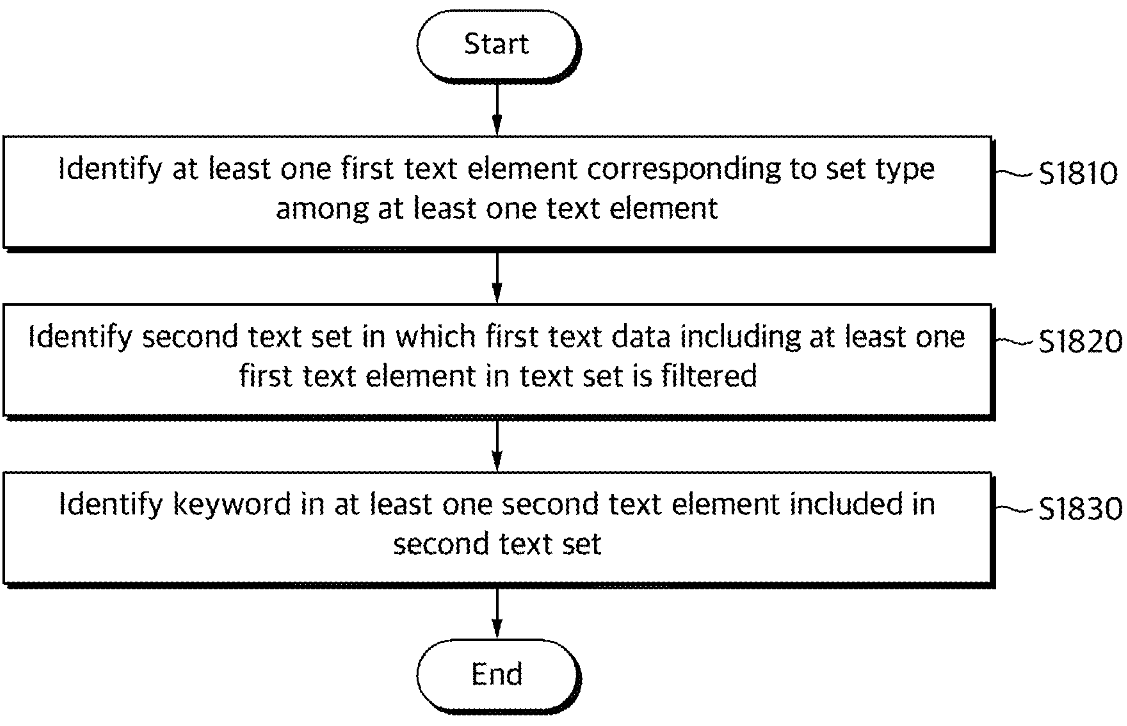

FIGS. 17 and 18 are flowcharts showing various preprocessing methods of text data related to filtering text elements corresponding to a set type.

Crawled text data may be preprocessed before determining the degree of association of a keyword pair. With regard thereto, filtered may be a text element corresponding to a set type among at least one text element in a text set according to an example embodiment. For example, in a first text element including phrases related to market conditions, a plurality of stocks with a low degree of association with each other may be listed. In other words, when the first text element including phrases related to market conditions is filtered, the performance of providing information on appropriate response words corresponding to a query word may be increased. Similarly, the second text element including advertising related-phrases may include false or exaggerated information regarding the purchase or sale of stock. In other words, when the second text element including the advertising-related phrases is filtered, the performance of providing information on appropriate response words corresponding to a query word may be increased.

In an example embodiment, filtered may be a first text element that includes a phrase related to market conditions among at least one text element included in a text set according to an example embodiment. For example, the electronic device 100 may identify a text element listing a set number of target keywords as a first text element including a phrase related to the market conditions. Generally, the news related to market conditions may list multiple stocks with low relevance and list the return rate for each of the plurality of stocks. In other words, a text element including a phrase with a set number of (for example, 5) or more target keywords listed sequentially may be determined to contain phrases related to the market situation. Alternatively, it may be determined that a text element in which large stocks with large market capitalization are listed sequentially as many as a set number (for example, 4) or more among stocks listed on a specific exchange includes phrases related to market conditions. Further, if the text element directly includes phrases related to market conditions, such as "closing market conditions" and "weekly market conditions," the electronic device 100 may classify the text element as a first text element including phrases related to market conditions.

In an example embodiment, filtered may be a second text element including advertising text among at least one text element in a text set according to an example embodiment. For example, the advertising text may be one of "This is not a recommendation to buy," "This is not a recommendation to sell" and "Please note that you are responsible for your investment."

In the present disclosure, the set type is not limited to the above example embodiment. The set type may also be added by a user of the electronic device 100.

FIG. 17 relates to an example embodiment of identifying keywords included in at least one second text element after at least one first text element corresponding to a set type is filtered from at least one text element. In other words, the preprocessing method of FIG. 17 may be a weak preprocessing method that filters only at least one first text element corresponding to a set type.

In operation S1710, the electronic device may identify at least one first text element corresponding to the set type among at least one text element.

In operation S1720, the electronic device may identify keywords in at least one second text element after at least one first text element is filtered from at least one text element.

FIG. 18 relates to an example embodiment of identifying keywords based on a second text set that first text data including at least one first text element corresponding to a set type in a text set is filtered. In other words, the preprocessing method of FIG. 18 may be a strong preprocessing method of filtering first text data itself including at least one first text element corresponding to a set type.

In operation S1810, an electronic device may identify at least one first text element corresponding to a set type among at least one text element.

In operation S1820, the electronic device may identify a second text set in which the first text data including at least one first text element in the text set is filtered. The second text set may include text data in which the first text data including the first text element among the text data included in the text set is filtered.

In operation S1830, the electronic device may identify a keyword in at least one second text element included in the second text set.

Figure 19:
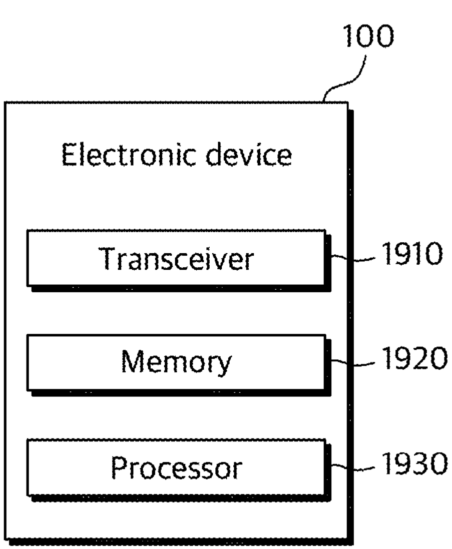
FIG. 19 shows a block diagram of an electronic device according to an example embodiment.

FIG. 19 shows a block diagram of an electronic device according to an example embodiment.

The electronic device 100 of FIG. 19 may correspond to the electronic device of the present disclosure. According to an example embodiment, the electronic device 100 may include a transceiver 1910, a memory 1920 and one or more processors 1930. The electronic device 100 illustrated in FIG. 19 shows only elements related to the example embodiments. Therefore, those skilled in the art may understand that other general-purpose elements may be included in addition to the elements illustrated in FIG. 19.

The electronic device may include the transceiver 1910 according to an example embodiment. The transceiver 1910 is a device for performing wired/wireless communication, and may communicate with an external electronic device. The external electronic device may be the terminal 110 or a server (not illustrated). Further, communication technologies used by the transceiver 1910 may include global system for mobile communication (GSM), code division multi access (CDMA), long term evolution (LTE), 5G, wireless LAN (WLAN), wireless-fidelity (Wi-Fi), Bluetooth™ (Bluetooth), radio frequency identification (RFID), infrared data association (IrDA), ZigBee and near field communication (NFC).

According to an example embodiment, the transceiver 1910 may receive information on a query word from the terminal 110 and provide information on a response word to the terminal 110.

The memory 1920 may store information for performing at least one method described above with reference to FIGS. 1 to 19. The memory 1920 may store one or more instructions to be executed by the one or more processors 1930. The memory 1920 may be referred to as storage and may be volatile memory or non-volatile memory. Further, the memory 1920 may store one or more instructions necessary to perform the operation of the processor 1930, and may temporarily store data stored on the platform or in an external memory.

According to an example embodiment, the memory 1920 may store text data included in the text set. Further, the memory 1920 may store a target keyword set, which is a set of keywords corresponding to stocks listed on a specific preset exchange or a set of keywords corresponding to the same type of financial product. The memory 1920 may store a deep learning-based NER model or a morpheme analysis model.

One or more processors 1930 may control the overall operation of the electronic device 100 and process data and signals. The one or more processors 1930 may perform one of the methods described above with reference to FIGS. 1 to 19. The one or more processors 1930 may be composed of at least one hardware unit. Further, the one or more processors 1930 may operate by one or more software modules generated by executing one or more instructions stored in the memory 1920.

The one or more processors 1930 may control embodiments performed by the electronic device 100 through interaction with the transceiver 1910 and the memory 1920 and further with elements that the electronic device 100 may include.

According to an example embodiment, by executing one or more instructions, the one or more processors 1930 may identify a text set including at least one text element, by using a deep learning-based NER model, identify keywords in at least one text element, based on the text set, determine the degrees of association of keyword pairs included in a keyword set including the keywords, obtain information on a query word that is input by a user, and based on at least one of the degrees of association, generate information on response words corresponding to the query word.

According to an example embodiment, executing one or more instructions, the one or more processors 1930 may identify the total frequency that a keyword pair is together included in each of at least one text element based on a text set, and may determine a co-occurrence graph based on a keyword set and the total frequency.

According to an example embodiment, executing one or more instructions, the one or more processors 1930 may identify the total frequency that a keyword pair is together included in each of at least one text element based on a text set.

According to an example embodiment, executing one or more instructions, based on the degree of association of a keyword pair consisting of one of at least one keyword and a query word, the one or more processors 1930 may identify keywords from which a keyword with low degree of association with the query word among at least one keyword is filtered, and identify the keywords as response words.

According to an example embodiment, executing one or more instructions, based on a directed weighted co-occurrence graph, the one or more processors 1930 may identify at least one keyword related to a query word among keywords included in a keyword set, and based on the degree of association of a keyword pair consisting of one of at least one keyword and the query word, generate information on response words corresponding to the query word.

According to an example embodiment, executing one or more instructions, based on the degree of association of a keyword pair consisting of one of at least one keyword and a query word, the one or more processors 1930 may filter some keywords with a low degree of association with the query word from at least one keyword according to a set rule.

According to an example embodiment, executing one or more instructions, the one or more processors 1930 may use morpheme analysis to identify keywords of a set word class within at least one text element.

According to an example embodiment, executing one or more instructions, the one or more processors 1930 may identify a category for each keyword, identify at least one keyword related to the query word among the keywords included in the keyword set, and filter keywords in the set category among at least one keyword.

According to an example embodiment, executing one or more instructions, the one or more processors 1930 may provide sorted information on response words based on information on the sort order of the response words.

According to an example embodiment, executing one or more instructions, when the query word includes a plurality of query words, the one or more processors 1930 may identify a plurality of response word sets corresponding to each of the plurality of query words, and determine at least one keyword simultaneously included in the plurality of response word sets as a response word corresponding to a plurality of query words.

According to an example embodiment, executing one or more instructions, the one or more processors 1930 may classify response words into a first response word, which is a target keyword, and a second response word, which is a general keyword, and the one or more processors 1930 may generate information on the first response word and information on the second response word separately.

According to an example embodiment, executing one or more instructions, the one or more processors 1930 may identify the first total frequency that a response word is included together with a query word in each of at least one text element and identify a category of the response word, and based on the first total frequency and the category, the one or more processors 1930 may generate a page that displays information on the response word.

According to an example embodiment, executing one or more instructions, the one or more processors 1930 may identify a first type response word included in a first group and a second type response word included in a second group among response words, and the one or more processors 1930 may generate information on the first type response word and information on the second type response word separately.

Meanwhile, in the present disclosure and drawings, example embodiments are disclosed, and certain terms are used. However, the terms are only used in general sense to easily describe the technical content of the present disclosure and to help the understanding of the present disclosure, but not to limit the scope of the present disclosure. It is apparent to those of ordinary skill in the art to which the present disclosure pertains that other modifications based on the technical spirit of the present disclosure may be implemented in addition to the example embodiments disclosed herein.

The electronic device or the terminal according to the above-described example embodiments may include a processor, a memory for storing and executing program data, a permanent storage such as a disk drive, and/or a user interface device such as a communication port, a touch panel, a key and/or an icon that communicates with an external device. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processer.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control devices. Similar to that elements may be implemented as software programming or software elements, the example embodiments may be implemented in a programming or scripting language such as C, C++, Java, assembler, Python, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as “mechanism,” “element,” “means” and “configuration” may be used broadly and are not limited to mechanical and physical elements. The terms may include the meaning of a series of routines of software in association with a processor or the like.

The above-described example embodiments are merely examples, and other embodiments may be implemented within the scope of the claims to be described later.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of generating keyword information performed by an electronic device, the method comprising:

identifying a text set including at least one text element;

using a named entity recognition model based on deep learning, identifying keywords in the at least one text element;

based on the text set, determining degrees of association of keyword pairs included in a keyword set including the keywords by:

identifying total frequency in which the keyword pairs are included in each of the at least one text element; and based on the keyword set and the total frequency, determining a co-occurrence graph that includes nodes and edges connecting the nodes, wherein each of the nodes corresponds to one of the keywords included in the keyword set, wherein a weight of each of the edges includes at least one of a first sub weight and a second sub weight that are related to a first node and a second node that are connected to the each of the edges, wherein the first sub weight is identified based on first total frequency in which a keyword corresponding to the first node and a keyword corresponding to the second node are included together in each of the at least one text element and second total frequency in which the keyword corresponding to the first node is included in each of the at least one text element, and wherein the second sub weight is identified based on the first total frequency and third total frequency in which the keyword corresponding to the second node is included in each of the at least one text element;

obtaining information on a query word that is input by a user; and based on at least one among the degrees of association, generating information on response words corresponding to the query word.

2. The method of claim 1, wherein the text set includes unstructured data related to finance, and wherein the at least one text element is at least one sentence in the unstructured data related to finance.

3. The method of claim 1, wherein the co-occurrence graph includes nodes and edges connecting the nodes, wherein each of the nodes corresponds to one of the keywords included in the keyword set, and wherein a weight of each of the edges is identified based on total frequency in which two keywords corresponding to each of a first node and a second node that are connected to the each of the edges are included together in each of the at least one text element.

4. The method of claim 1, wherein the co-occurrence graph is a directed weighted co-occurrence graph.

5. The method of claim 4, wherein generating of the information on the response words comprises:

based on the directed weighted co-occurrence graph, identifying at least one keyword related to the query word among the keywords included in the keyword set; and based on a degree of association of a keyword pair consisting of one of the at least one keyword and the query word, generating the information on the response words corresponding to the query word, wherein the degree of association of a keyword pair consisting of one of the at least one keyword and the query word is determined through a predetermined calculation using at least one sub weight related to a node corresponding to the one of the at least one keyword and a node corresponding to the query word on the directed weighted co-occurrence graph.

6. The method of claim 5, wherein generating of the information on the response words comprises:

based on the degree of association of a keyword pair consisting of one of the at least one keyword and the query word, filtering some keywords with a low degree of association with the query word from the at least one keyword according to a set rule.

7. The method of claim 1, further comprising:

identifying a keyword of a word class that is set in the at least one text element using morpheme analyzing, wherein the keyword set further includes the keyword of the word class that is set.

8. The method of claim 1, wherein identifying of the keywords comprises identifying a category of each of the keywords, and wherein generating of the information on the response words comprises:

identifying at least one keyword related to the query word among the keywords included in the keyword set; and filtering a keyword of a set category from the at least one keyword.

9. The method of claim 1, wherein the information on the response words includes at least one of information on a first text element in which the query word and the one of the response words are included together in the at least one text element and information on first text data including the first text element among text data included in the text set.

10. The method of claim 1, wherein generating of the information on the response words comprises:

based on information on a sort order of the response words, sorting and providing the information on the response words, wherein the information on the sort order of the response words is a size order of a degree of association between the query word and the response words.

11. The method of claim 1, wherein generating of the information on the response words comprises:

in case that the query word includes a plurality of query words, identifying a plurality of response word sets corresponding to each of the plurality of query words; and determining at least one keyword that is simultaneously included in the plurality of response word sets as the response words corresponding to the plurality of query words.

12. The method of claim 11, wherein the sort order of the response words is determined based on sort rankings of the response words in each of the plurality of response word sets.

13. The method of claim 1, wherein generating of the information on the response words comprises:

classifying the response words into a first response word which is a target keyword and a second response word which is a general keyword; and classifying and generating information on the first response word and information on the second response word separately, wherein the first response word includes a keyword corresponding to at least one stock that is listed on an exchange.

14. The method of claim 1, wherein generating of the information on the response words comprise:

identifying first total frequency in which one of the response words is included together with the query word in each of the at least one text element and a category of the response word; and based on the first total frequency and the category, generating a page where information on the response words is displayed.

15. The method of claim 1, wherein generating of the information on the response words comprises:

among the response words, identifying a first type response word included in a first group and a second type response word included in a second group; and classifying and generating information on the first type response word and information on the second type response word separately.

16. An electronic device comprising:

a transceiver;

at least one processor; and a memory configured to store one or more instructions executed by the at least one processor, wherein the at least one processor, executing the one or more instructions, is configured to:

identify a text set including at least one text element;

using a named entity recognition model based on deep learning, identify keywords in the at least one text element;

based on the text set, determine degrees of association of keyword pairs included in a keyword set including the keywords by:

identifying total frequency in which the keyword pairs are included in each of the at least one text element; and based on the keyword set and the total frequency, determining a co-occurrence graph that includes nodes and edges connecting the nodes, wherein each of the nodes corresponds to one of the keywords included in the keyword set, wherein a weight of each of the edges includes at least one of a first sub weight and a second sub weight that are related to a first node and a second node that are connected to the each of the edges, wherein the first sub weight is identified based on first total frequency in which a keyword corresponding to the first node and a keyword corresponding to the second node are included together in each of the at least one text element and second total frequency in which the keyword corresponding to the first node is included in each of the at least one text element, and wherein the second sub weight is identified based on the first total frequency and third total frequency in which the keyword corresponding to the second node is included in each of the at least one text element;

obtain information on a query word that is input by a user; and based on at least one among the degrees of association, generate information on response words corresponding to the query word.

17. A non-transitory computer-readable recording medium having a program for executing a method by a computing device, the method comprising:

identifying a text set including at least one text element;

using a named entity recognition model based on deep learning, identifying keywords in the at least one text element;

based on the text set, determining degrees of association of keyword pairs included in a keyword set including the keywords by:

identifying total frequency in which the keyword pairs are included in each of the at least one text element; and based on the keyword set and the total frequency, determining a directed weighted co-occurrence graph;

obtaining information on a query word that is input by a user; and based on at least one among the degrees of association, generating information on response words corresponding to the query word by:

based on the directed weighted co-occurrence graph, identifying at least one keyword related to the query word among the keywords included in the keyword set; and based on a degree of association of a keyword pair consisting of one of the at least one keyword and the query word, generating the information on the response words corresponding to the query word, wherein the degree of association of a keyword pair consisting of one of the at least one keyword and the query word is determined through a predetermined calculation using at least one sub weight related to a node corresponding to the one of the at least one keyword and a node corresponding to the query word on the directed weighted co-occurrence graph.

* * * * *